United States Patent
Rautenbach

(10) Patent No.: US 10,041,143 B2
(45) Date of Patent: Aug. 7, 2018

(54) HEAP LEACHING OF COPPER

(71) Applicant: BHP Chile Inc., Santiago (CL)

(72) Inventor: George Frederick Rautenbach, Santiago (CL)

(73) Assignee: BHP CHILE INC., Santiago (CL)

( * ) Notice: Subject to any disclaimer, the term of this patent is extended or adjusted under 35 U.S.C. 154(b) by 0 days.

(21) Appl. No.: 15/030,813

(22) PCT Filed: Oct. 22, 2014

(86) PCT No.: PCT/IB2014/002193
§ 371 (c)(1),
(2) Date: Apr. 20, 2016

(87) PCT Pub. No.: WO2015/059551
PCT Pub. Date: Apr. 30, 2015

(65) Prior Publication Data
US 2016/0258036 A1    Sep. 8, 2016

(30) Foreign Application Priority Data

Oct. 23, 2013 (ZA) ................... 2013/08223

(51) Int. Cl.
| | | |
|---|---|---|
| C22B 15/00 | (2006.01) | |
| C22B 3/08 | (2006.01) | |
| C25C 1/12 | (2006.01) | |

(52) U.S. Cl.
CPC ............ *C22B 15/0071* (2013.01); *C22B 3/08* (2013.01); *C22B 15/0067* (2013.01); *C25C 1/12* (2013.01); *Y02P 10/236* (2015.11)

(58) Field of Classification Search
CPC .......... C22B 3/16; C22B 15/0067; C22B 3/08
See application file for complete search history.

(56) References Cited

U.S. PATENT DOCUMENTS

| | | | | |
|---|---|---|---|---|
| 3,868,439 | A | * | 2/1975 | Wadsworth ......... C22B 15/0008 299/5 |
| 4,120,935 | A | * | 10/1978 | Fountain ............. C22B 15/0071 423/41 |
| 4,739,973 | A | | 4/1988 | Herndon |
| 5,622,615 | A | | 4/1997 | Young |

(Continued)

FOREIGN PATENT DOCUMENTS

| | | | |
|---|---|---|---|
| SU | 1178784 A | * | 4/1985 |
| WO | WO 2005/061741 | | 7/2005 |

(Continued)

OTHER PUBLICATIONS

Jergensen, Gerald V. (ED). Copper Leaching, Solvent Extraction, and Electrowinning Technology. Society for Mining, Metallurgy, and Exploration, 1999. pp. 41, 87, and 239-257. Print.*

(Continued)

*Primary Examiner* — George Wyszomierski
*Assistant Examiner* — Tima M McGuthry Banks
(74) *Attorney, Agent, or Firm* — Brinks Gilson & Lione; John C. Freeman

(57) ABSTRACT

A method of leaching copper from a heap of ore that includes at least one resting step followed by an irrigation step, wherein, during the irrigation step a leach solution that contains chloride ions is applied to the ore at a higher rate than during the resting step.

21 Claims, 39 Drawing Sheets

(56) References Cited

U.S. PATENT DOCUMENTS

| | | | |
|---|---|---|---|
| 6,926,753 B2* | 8/2005 | Faine | C22B 1/243 |
| | | | 75/712 |
| 2003/0075021 A1* | 4/2003 | Young et al. | C01G 23/047 |
| | | | 75/743 |
| 2005/0211019 A1* | 9/2005 | Crundwell | C22B 3/04 |
| | | | 75/375 |
| 2008/0241024 A1* | 10/200 | Riekkola-Vanhanen | C22B 15/0008 |
| | | | 423/27 |
| 2009/0173188 A1* | 7/2009 | Muller | C22B 3/045 |
| | | | 75/743 |
| 2011/0303051 A1 | 12/2011 | Gonzalez | |

FOREIGN PATENT DOCUMENTS

| | | |
|---|---|---|
| WO | WO 2007/134343 | 11/2007 |
| WO | WO 2012/001501 | 1/2012 |
| WO | WO 2014/030048 | 1/2014 |

OTHER PUBLICATIONS

Machine Translation of Beisembaev, B. et al., SU 1178784 A, published Apr. 1985.*
International Search Report dated Apr. 8, 2015 out of foreign priority Application No. PCT/IB2014/002193 (5 pages).
Written Opinion dated Apr. 8, 2015 out of foreign priority Application No. PCT/IB2014/002193 (5 pages).
International Preliminary Report on Patentability dated Feb. 2, 2016 from Application No. PCT/IB2014/002193 (10 pages).
Patent Examination Report dated Feb. 3, 2016 from Application No. AU 2014338680 (3 pages).
Notice of Acceptance dated Jul. 11, 2016 from Application No. AU 2014338680 (2 pages).

* cited by examiner

HEAP LEACHING OF COPPER

This application claims priority to International Application No. PCT/IB2014/002193 filed Oct. 22, 2014 and to South African Application No. 2013/08223 filed Oct. 23, 2013; the entire contents of each are incorporated herein by reference.

BACKGROUND OF THE INVENTION

This invention relates to a hydrometallurgical method of heap leaching copper from, principally, chalcopyrite or chalcopyrite mixed with refractory oxide minerals such as copper manganese oxides (($Cu,Mn,Co,Ni,Ca,Zn,Fe)x(O,OH)x$) and secondary sulphide minerals such as chalcocite, covellite, enargite and bornite. The method of the invention is also applicable to leaching of copper-containing clay minerals ($Cux.(K,Fe,Mg)x.Alx.Six.(OH)x$) which are refractory to conventional heap leaching applied for the treatment of oxide ores and secondary sulphide ores.

An object of the invention is to increase the copper extraction rate, typically from chalcopyrite contained in crushed ore, and to lower operational costs by reducing the current industry standard volume of leach solution applied to a heap in order to complete a leach cycle.

SUMMARY OF INVENTION

The invention is described hereinafter with reference to a heap leach operating method, for chalcopyrite, which employs a principle of a single resting step followed by continuous irrigation or multiple alternating resting steps and irrigation steps within a heap leach cycle in a high chloride environment to enhance chalcopyrite leach kinetics by preventing or reducing the passivation of the chalcopyrite.

The invention is primarily based on the surprising discovery that the leaching of chalcopyrite may be greatly enhanced by exposing the chalcopyrite surfaces to a "stagnant" or "slower-moving" leach solution that contains copper and chloride ions. The stagnant or slower-moving solution phase is promoted by a single resting step, or by multiple resting steps, followed by a subsequent irrigation step or steps within a heap leach cycle.

As used herein "a heap" includes a heap, a dump, a vat, a column or other body which contains an ore which is to be processed.

As used herein, a "solution application step" refers to an irrigation step, or to an addition of a leach or irrigation solution during an agglomeration step.

A heap leach cycle may start with an initial rest period after construction followed by continuous irrigation, or it may start with a solution application step which is followed by a resting step, which then may be followed by multiple alternating irrigation and subsequent resting steps, all within the heap leach cycle.

As used herein, "multiple resting steps" refers to more than one resting step.

As used herein, an "agglomeration step" refers to the use of an agglomeration technique, only once within a heap leach cycle, to apply leach solution to ore prior to or during heap construction. This step is however not essential for the implementation of the method of the invention. A heap may be constructed without using an agglomeration technique.

In the method of the invention the ore is subjected to at least one resting step and a subsequent irrigation step within a heap leach cycle. The initial resting period after ore agglomeration (if used) and heap construction may be considered as the first resting step. As indicated the ore may be subjected to multiple resting steps and subsequent irrigation steps.

Preferably during a resting step:
1. a leach solution is not applied to the heap;
2. a leach solution in the heap as a result of ore agglomeration, or a first irrigation step, is stagnant or moves at a lower velocity over chalcopyrite surfaces of ore in the heap, than during an irrigation step;
3. heap drainage of internal moisture which may occur is, optionally, contained in a pregnant solution pond (referred to as a "PLS pond");
4. the chloride ion concentration of the leach solution contacting the ore is between 100 g/L and 190 g/L;
5. the leach solution in contact with the ore, at any given time within the resting step, contains soluble copper of at least 0.5 g/L;
6. the copper in the leach solution in contact with the chalcopyrite surfaces increases to a greater concentration than in the leach solution contacting the chalcopyrite surfaces during an irrigation step due to the stagnant solution or slower-moving solution over the chalcopyrite surfaces; and
7. the duration of the resting step is between 20 hours and 50 days;

The pH of the leach solution contacting the ore may increase to above pH 1.5 as a result of acid consumption due to dissolution of gangue minerals. The increase in the pH of the leach solution is a function of the ore's acid consuming properties and the duration of the resting step. The solution pH in contact with the ore may be expected to be within the range pH 0-3.5. The pH range specified is by way of example only and is not limited in the method of the invention. The rate of copper extraction increases with increased solution pH in the range pH1.0 to pH3.0.

The increase in the pH of the leach solution may lead to jarosite or some form of iron sulphate and/or iron hydroxy chloride precipitation. This allows for the implementation of a technique to lower the levels of impurities such as sulphate, iron, potassium and sodium in the leach circuit.

The method of the invention makes use of at least one resting step within a heap leach cycle. As stated an initial period after ore agglomeration and heap construction may be considered as a first or single rest step, prior to multiple steps of irrigation and resting, or continuous irrigation only. The number of resting steps is not limited and depends on the incremental copper extraction achieved during each resting step and the overall target copper extraction, or the maximum achievable copper extraction.

During a resting step the heap may be aerated. A typical aeration rate is of the order of 0.01 $Nm^3/h \cdot ton$.

The implementation of the method of the invention does not require the addition of any form of solid chloride source directly to the ore prior to or during agglomeration.

An "irrigation step" includes the use of an irrigation grid whereby the leach solution is applied to the entire heap directly after heap construction, or after each resting step. An irrigation grid may be located on a surface of the heap, or within the heap, or a combination of both forms of construction may be employed.

The irrigation grid may be constructed or operated in such a manner that the leach solution can be applied according to requirement only to a selected section or sections of the heap.

A pond may be employed to hold the irrigation or leach solution which is used during the solution application step. This pond is referred to herein as the "solution application pond".

Preferably, during continuous irrigation or for each irrigation step:
1. the sulphuric acid concentration of the solution applied to the ore (which solution is also referred to herein as "raffinate") is between 4 g/l and 100 g/l;
2. the chloride ion concentration of the solution is between 100 g/l and 190 g/l;
3. liquid heap drainage is optionally contained in the PLS pond; and
4. copper may be recovered, at least partly, from the solution in the PLS pond, by means of a solvent extraction step with at least one copper-loaded organic washing stage to promote an electrolyte chloride ion concentration below 50 ppm.

The solution applied to the ore, from the solution application pond, may be produced, at least partly, by means of the solvent extraction step.

The quantity of leach solution applied to the heap should not exceed 3 $m^3$ per ton of ore over a complete leach cycle. This value is exemplary only and non-limiting and does not include liquid arising from heap rinsing after a leach cycle.

Acid in the irrigation solution reacts with gangue minerals in the ore leading, for example, to acid leaching of chlorite and biotite. This type of reaction generates heat and, by controlling the irrigation rate and the concentration of the acid, the ore temperature may be significantly raised, depending, inter alia, on the content of reactive gangue minerals in the ore. The elevated temperature contributes to faster mineral oxidation rates and, consequently, leads to an increase in metal recovery and a reduction in leach cycle time.

The increase in temperature is particularly important for increasing the leaching rate of refractory copper oxides; for example "black oxides" ($(Cu,Mn,Co,Ni,Ca,Zn,Fe)x(O,OH)x$) and copper-containing clay minerals ($Cux.(K,Fe,Mg)x.Alx.Six.(OH)x$). The increased temperature overcomes or reduces the activation energy which is required to leach the refractory copper oxide minerals and this leads to an increase in the rate and extent of copper dissolution.

The dissolution of copper sulphide minerals such as chalcopyrite is improved by aeration of the heap. Aeration provides oxygen that significantly increases the rate and extent of copper dissolution. Aeration may be effected during an irrigation step. An aeration rate of 0.01 $Nm^3/h·ton$ is typical, but this value is exemplary and is non-limiting.

A "heap section" as used herein refers to a segment of a heap characterised as having a smaller surface area than an entire heap.

As used herein, a "copper heap leach circuit" refers to at least one heap constructed on a lined pad that facilitates heap drainage to a collective solution system that includes at least one pond connected through piping to a solvent extraction and electrowinning process to recover copper from heap drainage (commonly referred to as a "pregnant leach solution"). The lower copper and higher acid solution from the solvent extraction process (commonly referred to as raffinate) is used, at least partly, for heap irrigation.

As used herein, a "dynamic copper heap leach circuit" refers to a copper heap leach circuit, wherein the leached material is removed from the circuit, after the heap cycle is completed. Such removal is also referred to as "reclaiming".

In the case of a dynamic copper heap leach circuit, subsequent to the aforementioned single or multiple resting and irrigation steps, a rinse step may be included at the end of the leach cycle aimed at recovering soluble copper and chloride from leached material before the process of reclaiming leached or waste material from a leach circuit.

During a rinse step:
1. the rinse solution may be applied to an entire heap or to a section of a heap which is to be reclaimed directly after the rinse step;
2. internal moisture may be drained from the entire heap or the heap section, as the case may be, before application of the rinse solution;
3. the rinse solution may be prepared in a rinse pond and may consist, at least mostly, of water produced by a process of reverse osmosis, sea water, water from a naturally occurring source, or any available process water, or any combination of the aforegoing; and
4. the rinse solution may contain less than 100 g/l chloride ions;

The rinse solution may contain less sulphuric acid than the solution which is applied to the ore during an irrigation step.

Drainage from the heap or from the heap section, as a result of irrigating with the rinse solution during a rinse step, may be contained, at least partly, in the PLS pond. This step is applicable, particularly, when the initial drainage has copper and chloride concentrations that are considered acceptable for blending with the solution in the PLS pond.

Alternatively, solution drained from the heap or the heap section, as a result of irrigating with the rinse solution during or after the rinse step, may be contained, at least partly, in a pond which is referred to herein as an "intermediate pond".

For optimum performance the rinse period should not exceed 50 days. This value however is exemplary and non-limiting.

The rinse solution irrigation rate should not exceed 7 liters applied per square meter of heap surface per day. However, higher irrigation rates may be used.

During a rinse step the heap may not be aerated.

A rinse step is not used for leaching copper from any copper sulphide mineral.

A rinse step may be implemented using the same irrigation grid as what is employed for an irrigation step.

Solution produced from the process of solvent extraction or solution contained in the solution application pond may be added to solution contained in the intermediate pond in order to maintain a water balance in the leach circuit.

Chloride ions may be introduced into the leach circuit by the addition of one or more of the following: $NaCl$, $MgCl_2$, $KCl$ and $AlCl_3$, to a solution held in the intermediate pond.

At least part of a solution contained in the intermediate pond may be transferred to the PLS pond.

At least part of the solution contained in the intermediate pond may be transferred to the solution application pond.

At least part of the solution contained in the PLS pond may be transferred to the solution application pond directly without being subjected to the solvent extraction step.

BRIEF DESCRIPTION OF THE DRAWINGS

The invention is further described by way of example with reference to the accompanying drawings in which.

DESCRIPTION OF PREFERRED EMBODIMENT

Figure 1:
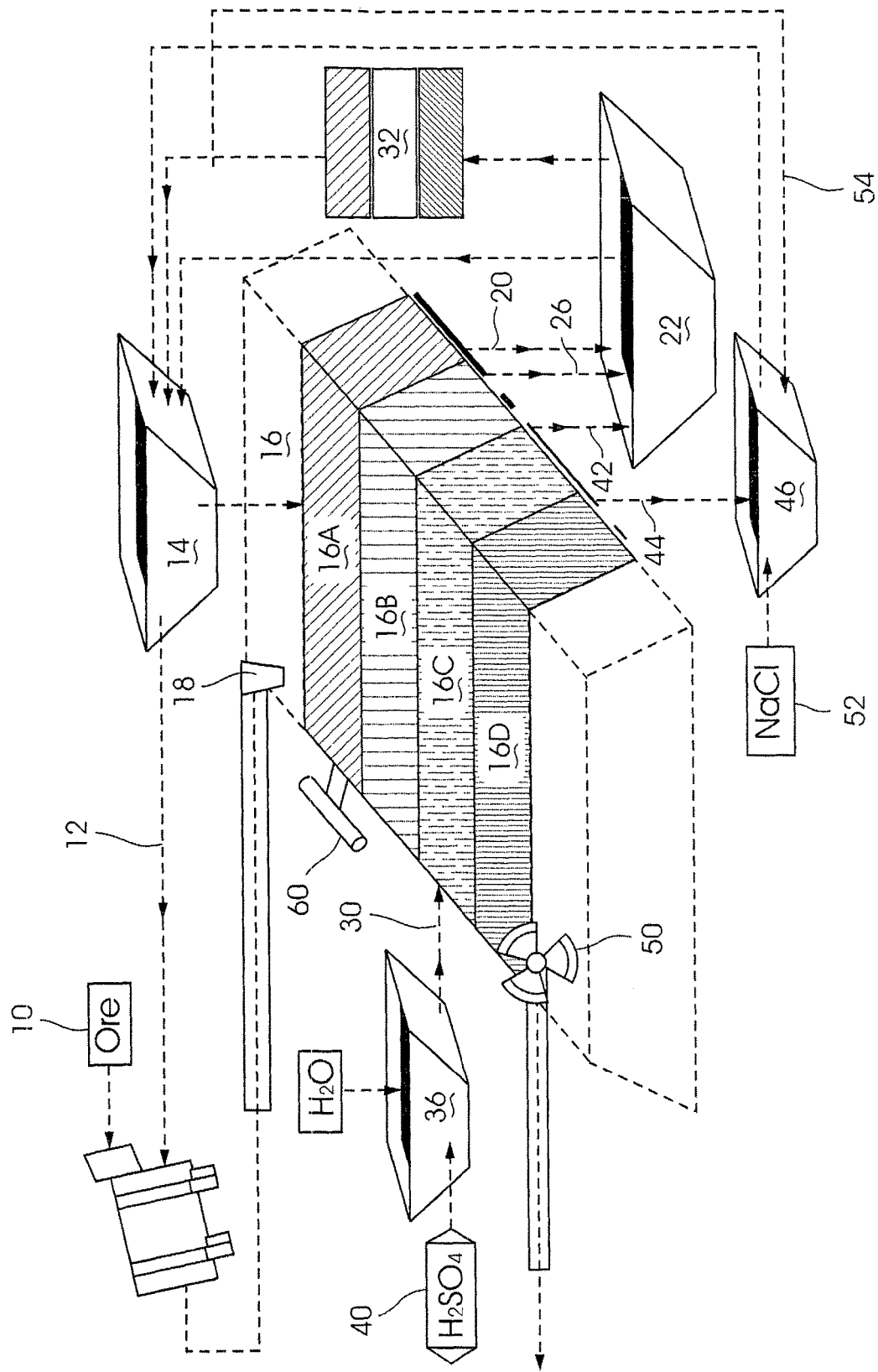
FIG. 1 is a simplified dynamic flowsheet illustrating one way in which the method of the invention may be implemented.

FIG. 1 is a simplified dynamic flowsheet of the method of the invention. General operational aspects of a heap leach circuit, including solvent extraction, electrowinning, agglomeration, ore stacking and reclaiming steps are not described herein.

The heap circuit is characterized in that it contains mostly chalcopyrite mineral in the ore, which may be mixed with secondary copper sulphide minerals such as chalcocite, covellite, enargite and bornite. Secondly, a leach solution which is high in chloride (between 100 g/l Cl$^-$ and 190 g/l Cl$^-$) is used. The description is not limited to leaching of chalcopyrite ores and the same method may be applied to refractory oxide minerals such as copper manganese oxides ((Cu,Mn,Co,Ni,Ca,Zn,Fe)x(O,OH)x) and secondary sulphide minerals such as chalcocite, covellite, enargite and bornite. The method of the invention is also applicable to leaching of copper-containing clay minerals (Cux.(K,Fe,Mg)x.Alx.Six.(OH)x) which are refractory to conventional heap leaching applied for the treatment of oxide ores and secondary sulphide ores.

FIG. 1 illustrates a solution management principle to minimize consumption of a reagent such as chloride ions and to maintain a copper concentration during a solution application step to achieve a copper concentration of above 0.5 g/l in solution contacting the chalcopyrite surface, during a resting step.

Ore 10 is agglomerated with a solution 12 from a solution application pond 14 and a heap 16 is constructed by a process of ore stacking 18.

Following construction the heap 16 is subjected to a resting step after agglomeration followed by continuous irrigation or multiple irrigation and subsequent resting steps within a heap leach cycle.

In this example the heap 16 is considered to be part of a series of constructed heaps, under different stages of operation in the heap leach cycle referred to, successively, as 16D, 16C, 16B, 16A etc.

The solution applied to the heap 16A during the irrigation step is drawn from the solution application pond 14. Drainage 20 from the heap 16A, resulting from the irrigation step, is contained in a pregnant leach solution pond (PLS pond) 22.

Internal moisture 26, from a preceding heap 16B is drained into the PLS pond 22 after a final irrigation cycle, before application of a rinse solution 30.

Copper is recovered from the solution contained in the PLS pond by passing the solution, or at least part of the solution, through a solvent extraction and electrowinning step 32.

Part of the solution contained in the PLS pond 22 is sent directly to the solution application pond 14.

The rinse solution 30 which is applied to a preceding heap section 16C is taken from a rinse pond 36. The rinse solution has a chloride ion concentration which is less than 100 g/l and is prepared with water produced by a process of reverse osmosis, sea water, water from a naturally occurring source, or any other available process water, or any combination of the aforegoing.

The rinse solution 30 may be acidified by the addition of sulphuric acid 40 to prevent copper precipitating during a rinsing step. Initial drainage 42 resulting from the application of the rinse solution 30 to the heap section 16C is collected in the PLS pond 22. Drainage 44, resulting from the application of the rinse solution 30 to a preceding heap section 16D, is collected in an intermediate pond 46 before implementation of a reclaiming process 50.

An addition, or makeup, of salt 52 is performed in the intermediate pond 46. Solution from this pond is sent directly to the solution application pond 14. Solution 54, produced by the process of solvent extraction 32, can be sent to the intermediate pond 46 in order to maintain a water balance in the leach circuit.

The typical heap 16A may be aerated during the resting step and irrigation step using an aeration system 60 (notionally shown) which is located at a base of the heap above a drainage layer. An aeration rate 0.01 $Nm^3/h \cdot ton$ is typical, but could range between 0.002 and 0.05 $Nm^3/h \cdot ton$ depending on the grade of the sulphide mineral.

As used hereafter, the word "sal" refers to data generated within parameters which are described in this specification.

Figure 2:
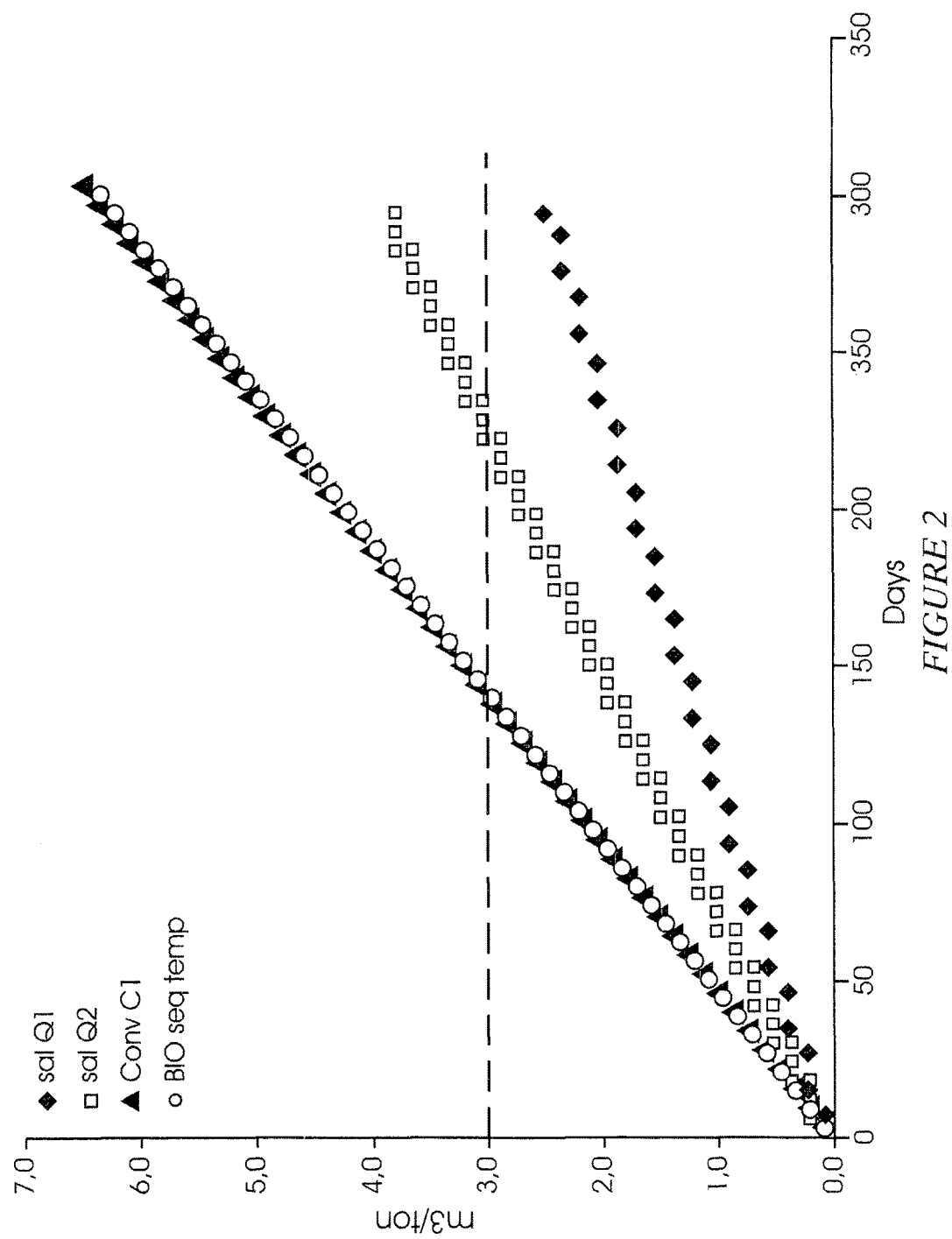
FIG. 2 illustrates curves of the accumulated solution application volume to ore mass ratio over time for four leach tests.

FIG. 2 presents the accumulated solution application volume to ore mass ratio (expressed as $m^3/ton$) over time for four leach tests targeting copper extraction from crushed ore (passing 80% ½") containing 85% chalcopyrite with a total copper grade of 0.6 wt. %. The four data sets include a sequential temperature-increase bioleach, an ambient temperature (25° C.), chloride ion-based leach (conventional Cl) (as described in WO 2007134343 A2), and two ambient temperature (25° C.) multiple resting and curing-based leach tests conducted within parameters as described herein, referred to as sal Q1 and Q2. The sal Q1 had a final volume to ore mass ratio below 3 $m^3/ton$. Both Q1 and Q2 employed a 10 day resting cycle with the main difference being the volume of leach solution added during the irrigation cycle. No rinse cycles were included in the data sets.

Figure 3:
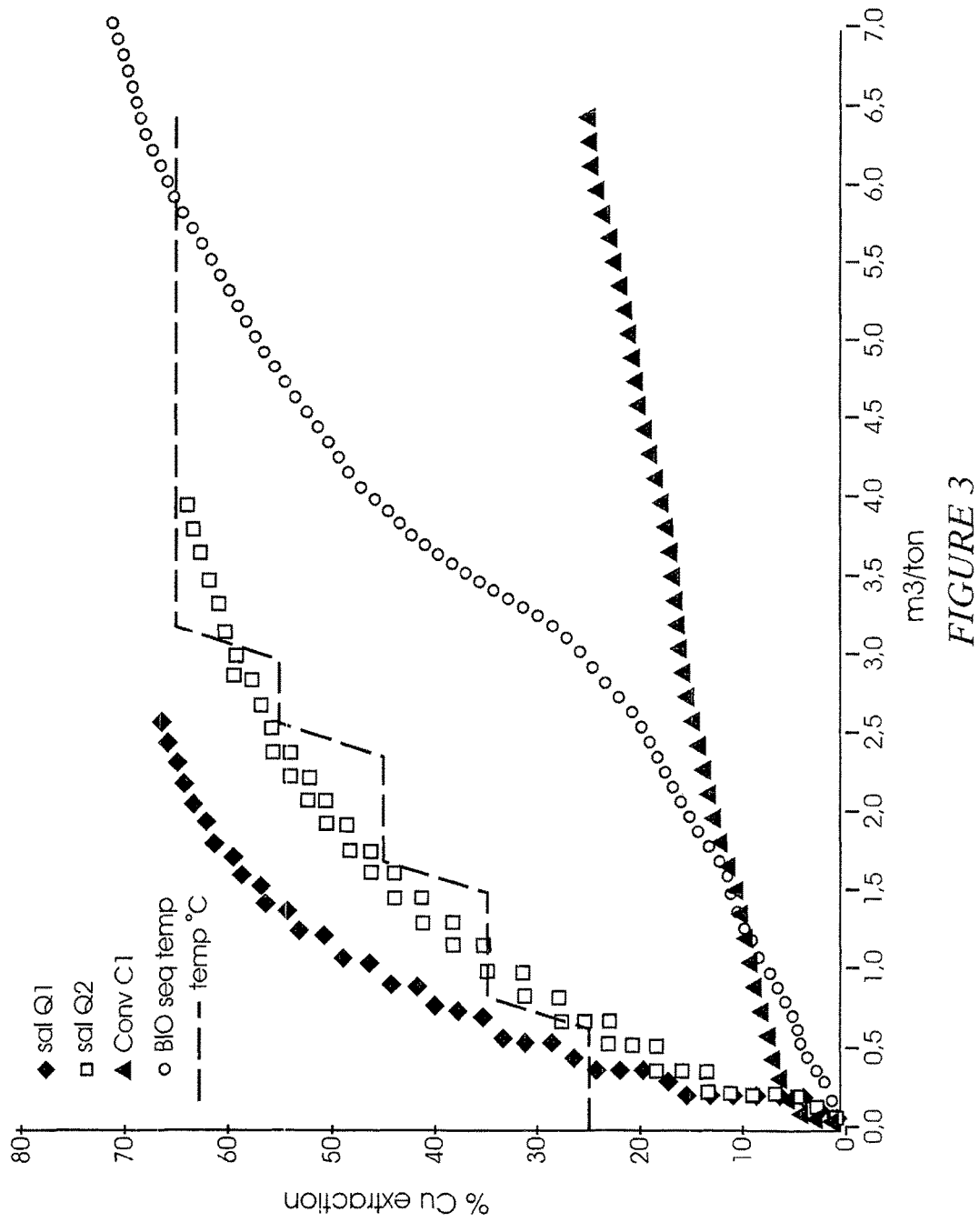
FIG. 3 reflects the percentage of copper extracted from the leach tests referred to in connection with FIG. 2.

The percentage of copper extracted from the leach tests shown in FIG. 2 is presented in FIG. 3 against the accumulative solution application volume to ore mass ratio. The sequential temperature increase of the bioleach test is also shown. It is known that the copper extraction rate from chalcopyrite is enhanced with increased temperature—significantly above 25° C. Therefore, the enhanced copper extraction rate achieved with the sal Q1 and Q2 tests at a temperature of 25° C. should be noted as a significant improvement which is achieved by applying the method of the invention. The lower solution volume application test Q1 achieved a higher copper extraction rate than Q2, which exceeded the upper limit solution application volume to ore mass ratio of 3 $m^3/ton$, as stipulated herein.

Figure 4:
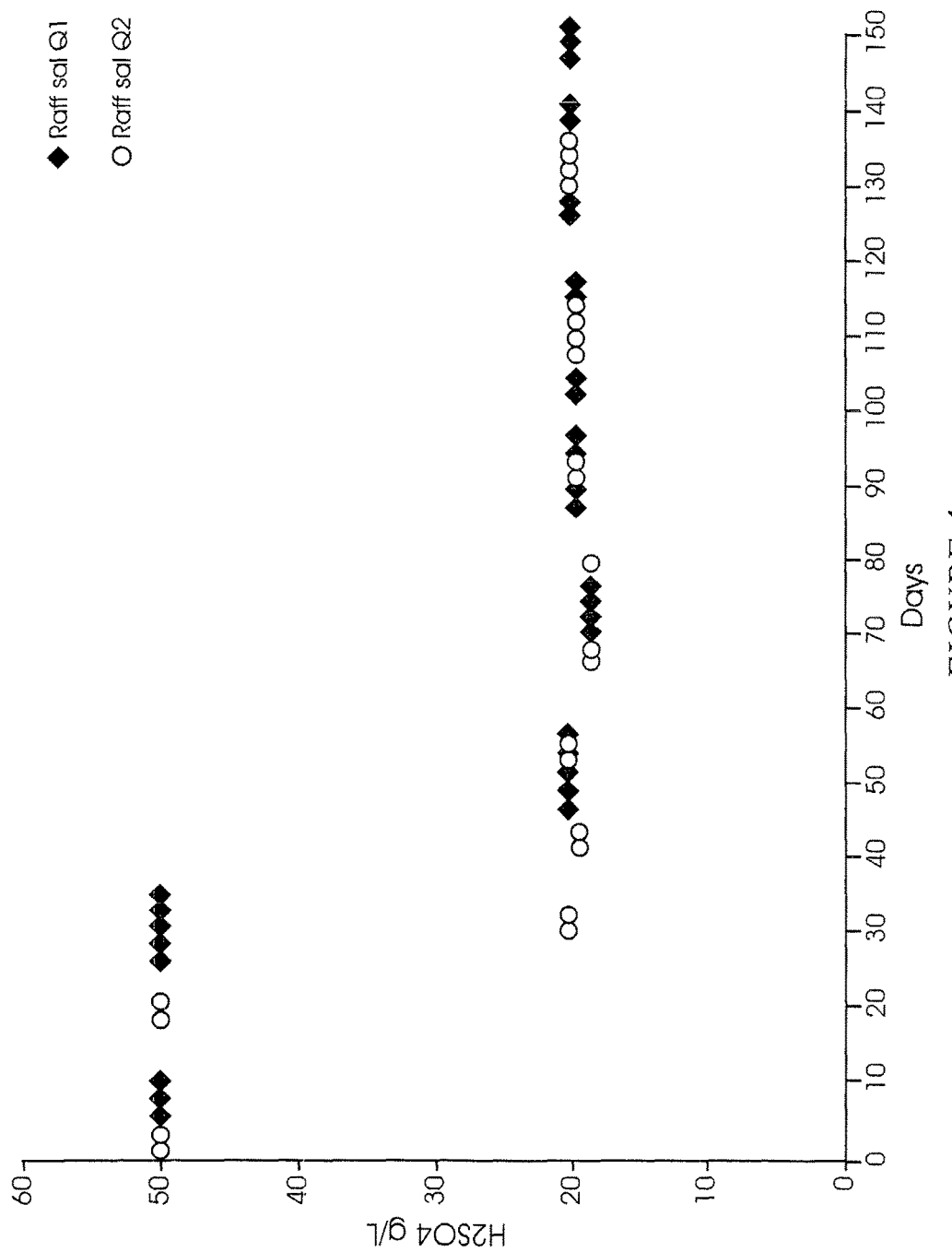
FIG. 4 shows sulphuric acid concentrations of leach solutions.

The sulphuric acid concentrations of the solutions applied to the ore during the irrigation steps of the aforementioned sal Q1 and Q2 are presented in FIG. 4 (Raff sal Q1 and Q2).

Figure 5:
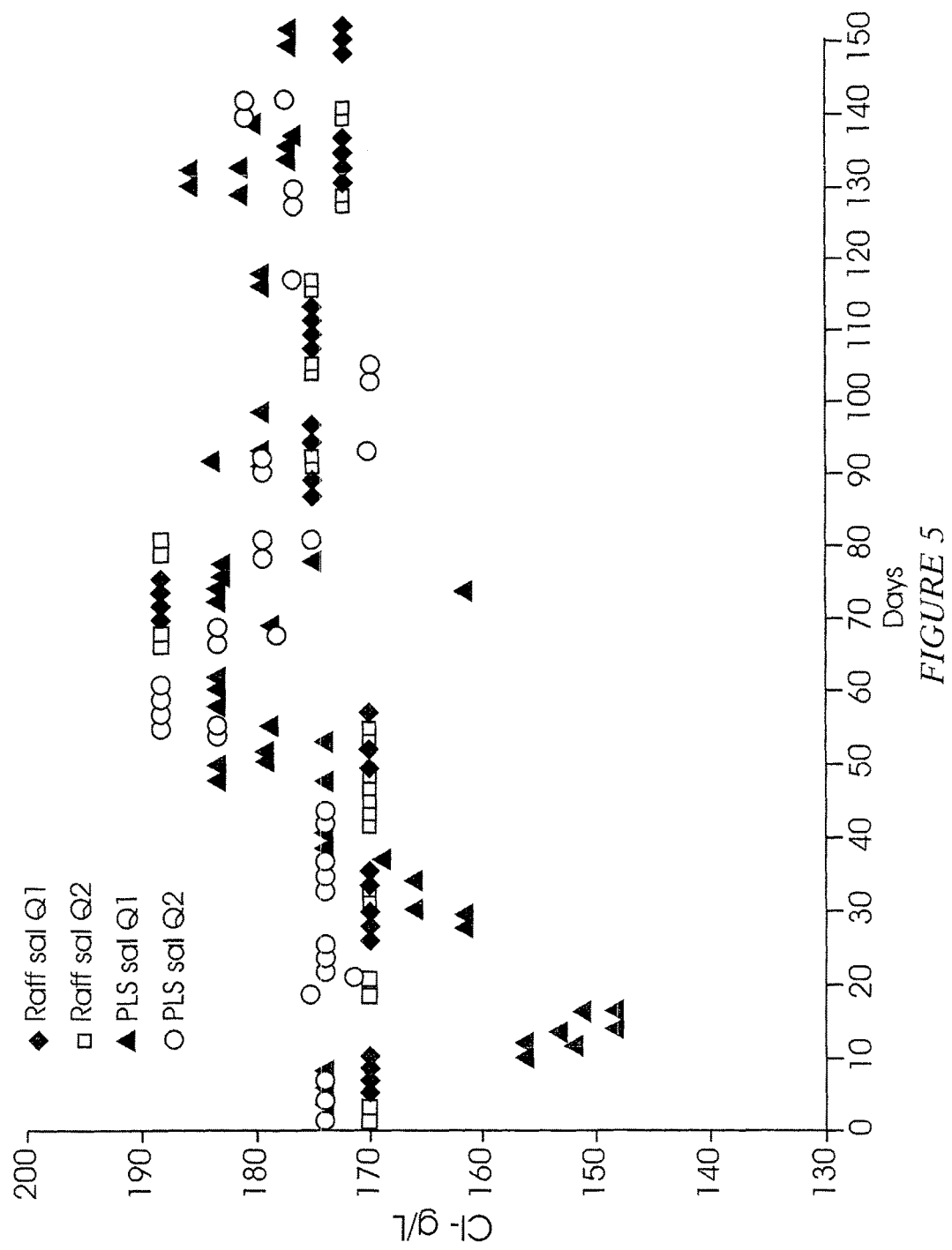
FIG. 5 shows chloride ion concentrations of leach and drainage solutions.

The chloride ion concentrations of the solution applied to the ore during the irrigation steps (Raff sal Q1 and Q2) and subsequent drainage (PLS Q1 and Q2) are presented in FIG. 5.

Figure 6:
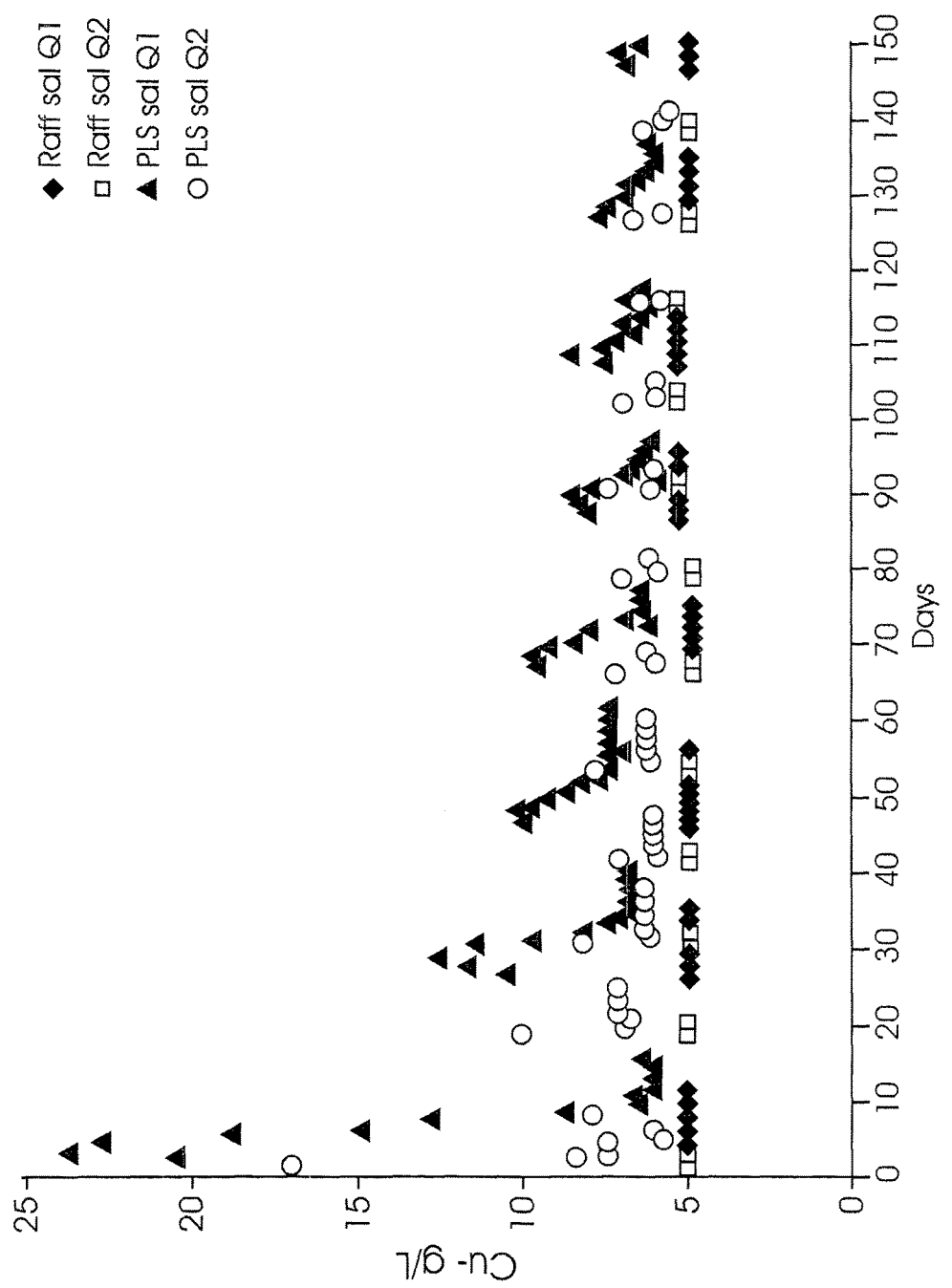
FIG. 6 presents copper concentrations of a leach solution during an irrigation step and during subsequent drainage.

FIG. 6 presents copper concentrations of the solution applied to the ore during the irrigation steps (Raff sal Q1 and Q2) and subsequent drainage (PLS Q1 and Q2). The copper concentrations of the drainage decrease from the start of each irrigation cycle to the end. The copper concentrations obtained from the initial drainage during the irrigation cycle represent, to a reasonable extent, the copper concentrations contacting the chalcopyrite mineral surface at the end of a resting cycle. The saL Q1 with the lower solution to ore ratio showed higher copper concentration values in the PLS following each resting step.

Figure 7:
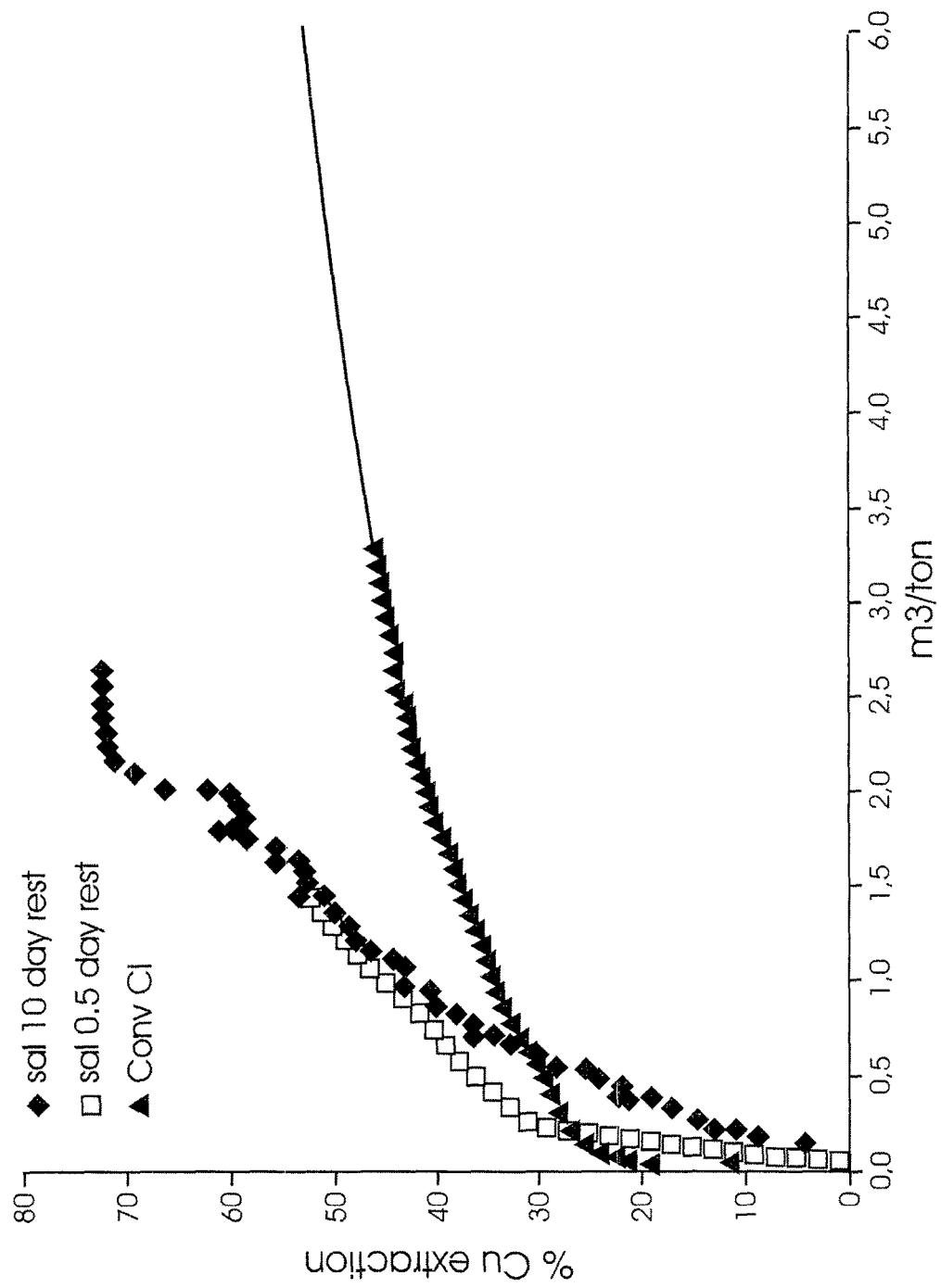
FIG. 7 contains graphs of copper extraction as a function of accumulated solution application volume to ore mass ratio for three leach tests.
Figure 8:
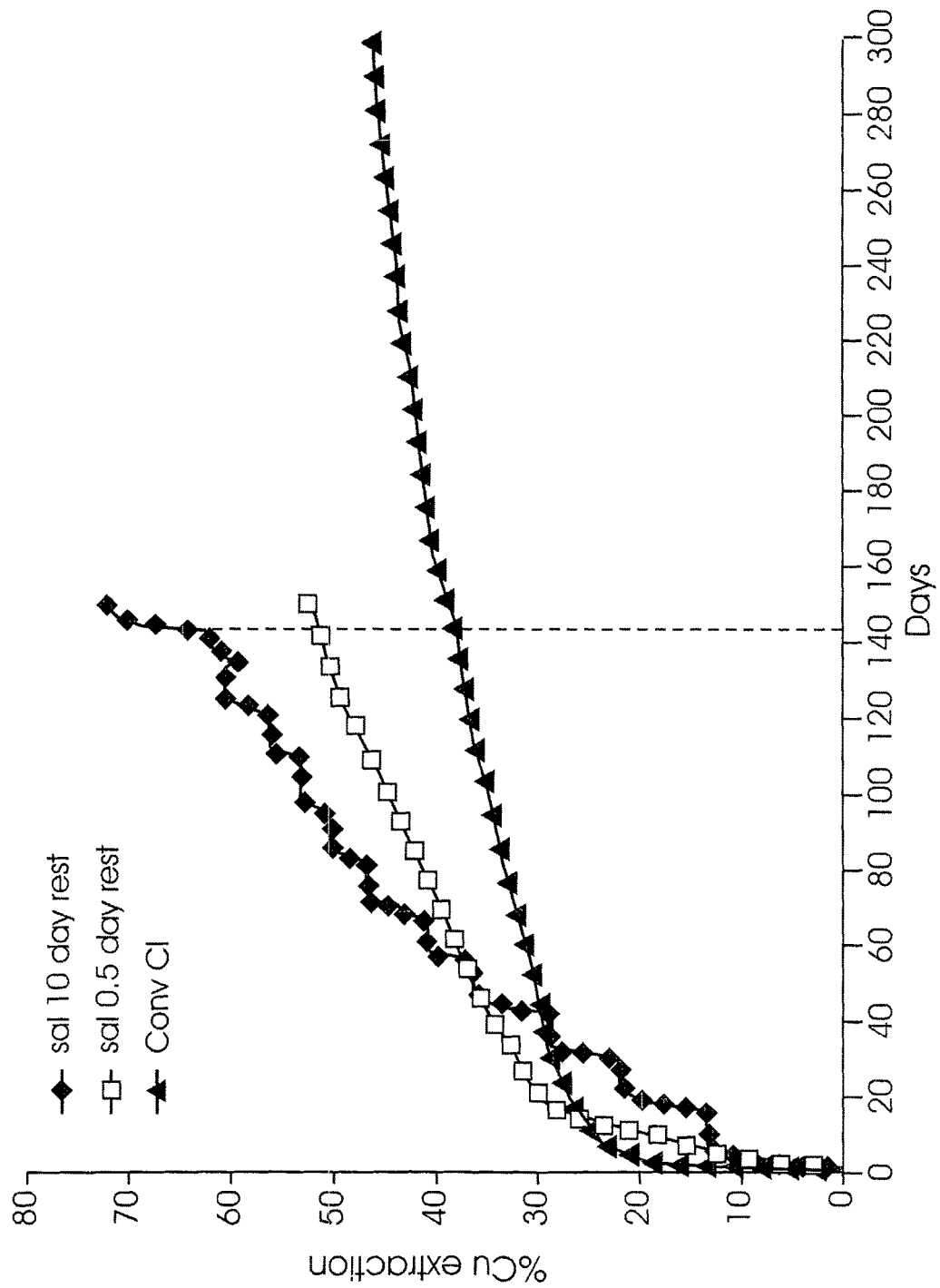
FIG. 8 depicts copper extraction as the function of time during a leach period.

FIG. 7 presents the copper extraction versus the accumulative solution application volume to ore mass ratio (expressed as $m^3/ton$) for three leach tests targeting copper extraction from crushed ore (passing 80% ½") containing 90% chalcopyrite with a total copper grade of 0.4 wt. %. The three data sets include an ambient temperature (25° C.) chloride ion-based leach (conventional Cl) (as described in WO2007134343 A2) and two ambient temperature (25° C.) "multiple resting and curing" based leach tests conducted within parameters as described herein, referred to as a sal 10 day rest (time resting step) and a 0.5 day rest. A rinse cycle was performed on the 10 day rest condition after a solution application volume to ore mass ratio of 2 $m^3/ton$, on day 145 of the leach cycle as shown in FIG. 8, which presents the copper extraction for the same tests versus the leach period in days.

Figure 9:
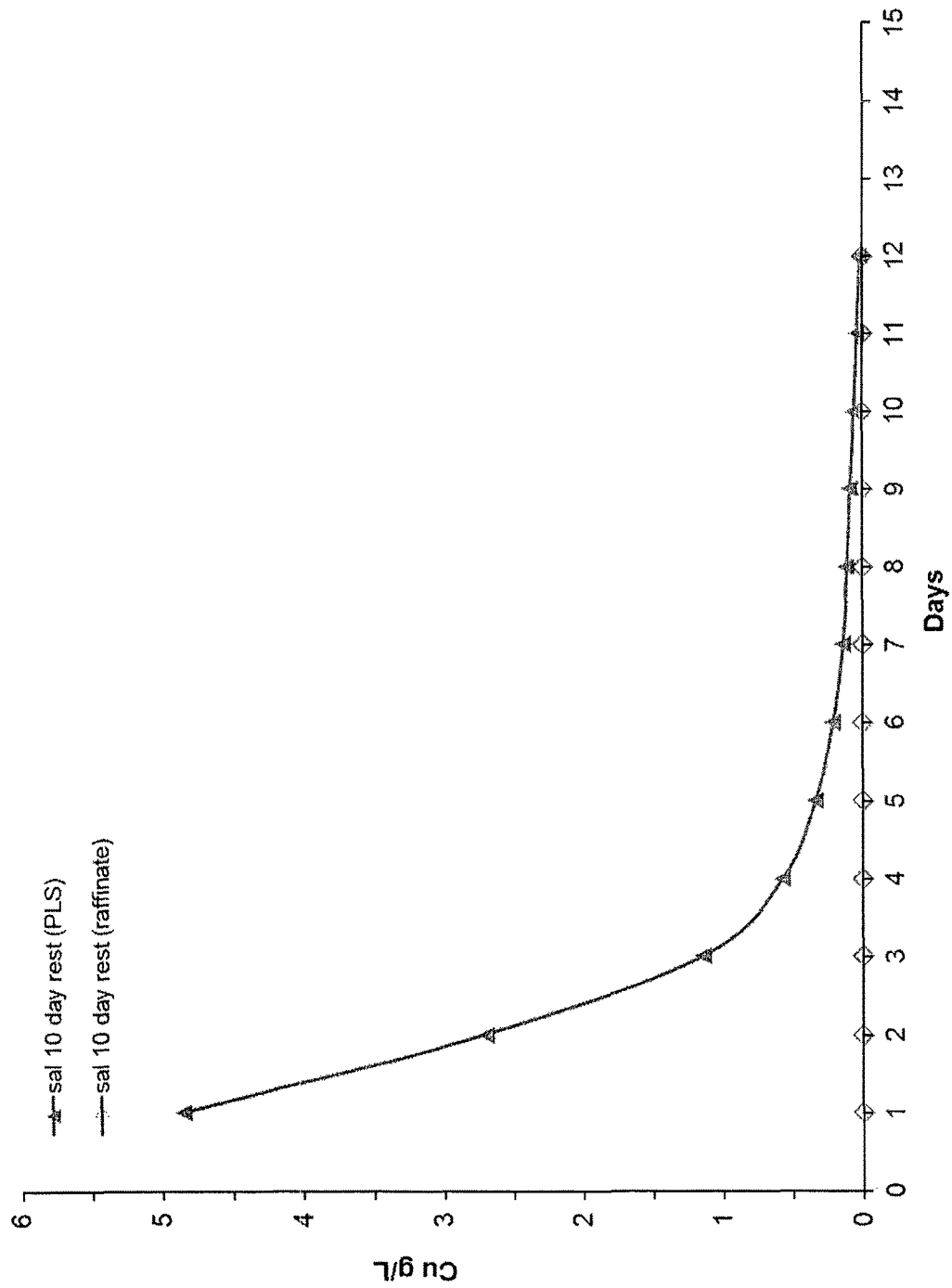
FIG. 9 shows copper concentration of a PLS and of raffinate as a function of time.

The copper concentrations of the PLS and raffinate during the rinse cycle are shown in FIG. 9. A copper rinse efficiency of above 90% was obtained in 12 days.

Figure 10:
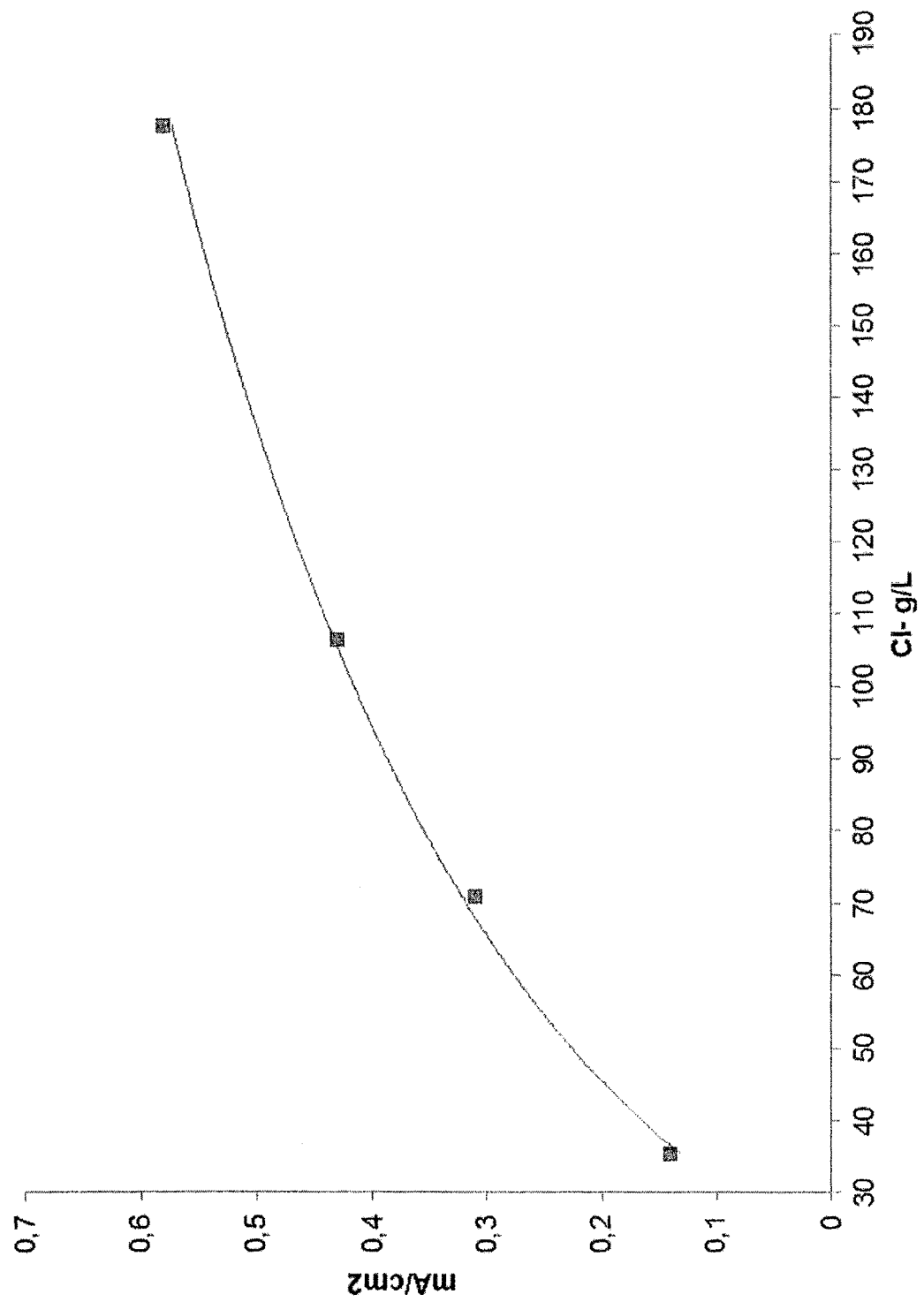
FIG. 10 shows peak charge transient values of electrodes as a function of chloride ion concentration.

Chalcopyrite electrodes were exposed to different open circuit potentials promoted by different solutions containing the same concentrations of copper and iron, but increasing chloride ion concentrations. Subsequently, the electrodes were each subjected to an applied potential range and the peak charge transient expressed as $mA/cm^2$ (and equivalent to the mineral dissolution rate) was plotted against the chloride ion concentration (FIG. 10). A chloride ion concentration range, stipulated herein between 100 and 190 g/l, was considered an acceptable concentration in order to achieve an acceptable chalcopyrite dissolution rate under the conditions described for the method of the invention.

Figure 11:
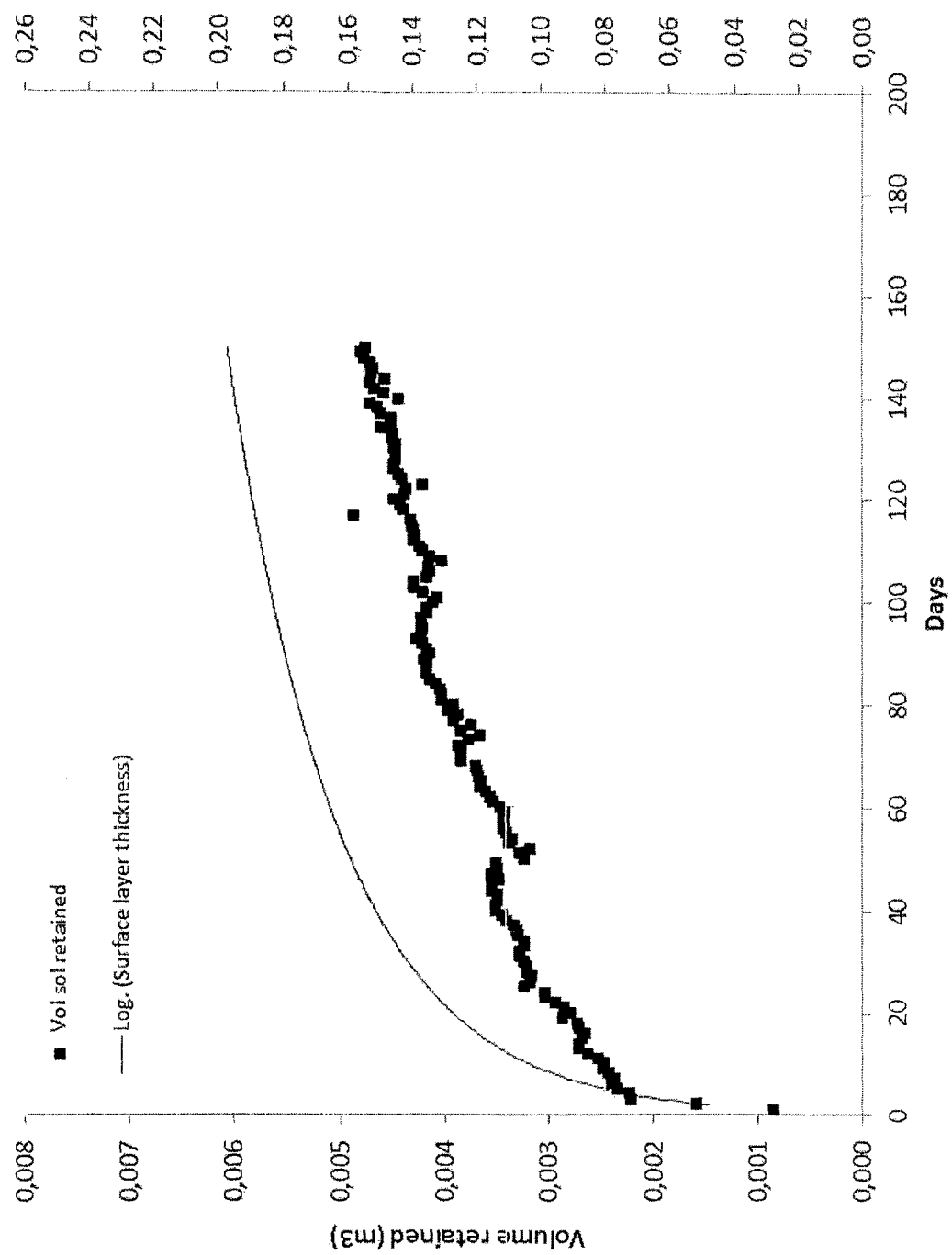
FIG. 11 depicts solution surface film thickness over ore particles as a function of solution volume in a test column.

Multiple fractions of a known amount of screened ore between 1.2 and 6.4 mm were mixed and loaded in a column with an approximated ore surface area. The column was subjected to a continuous solution application at a rate commonly employed in industry. The curve in FIG. 11 shows the increase in the calculated solution film thickness (mm) over the ore particles as a function of the solution volume retained in the column. Due to solution retention properties of ore in heap leach related systems, it is widely accepted that an increase in the solution volume to ore ratio within the same leach period may result in increased solution volume retention, which may, in turn, increase the thickness of the layer surrounding the ore particles. The solution volume to ore ratio may increase such that all void spaces between the ore particles can be filled with solution reaching saturation. The opposite may be considered when decreasing the solution volume to ore ratio. The method of the invention, by using rest periods, allows the solution volume to ore ratio to be minimised so that the solution layer surrounding ore particles is also minimised thereby promoting rates of reactant species transfer, such as acid, oxygen, ferric ions and cupric ions, to the ore surface so that mineral dissolution rates are enhanced.

Figure 12:
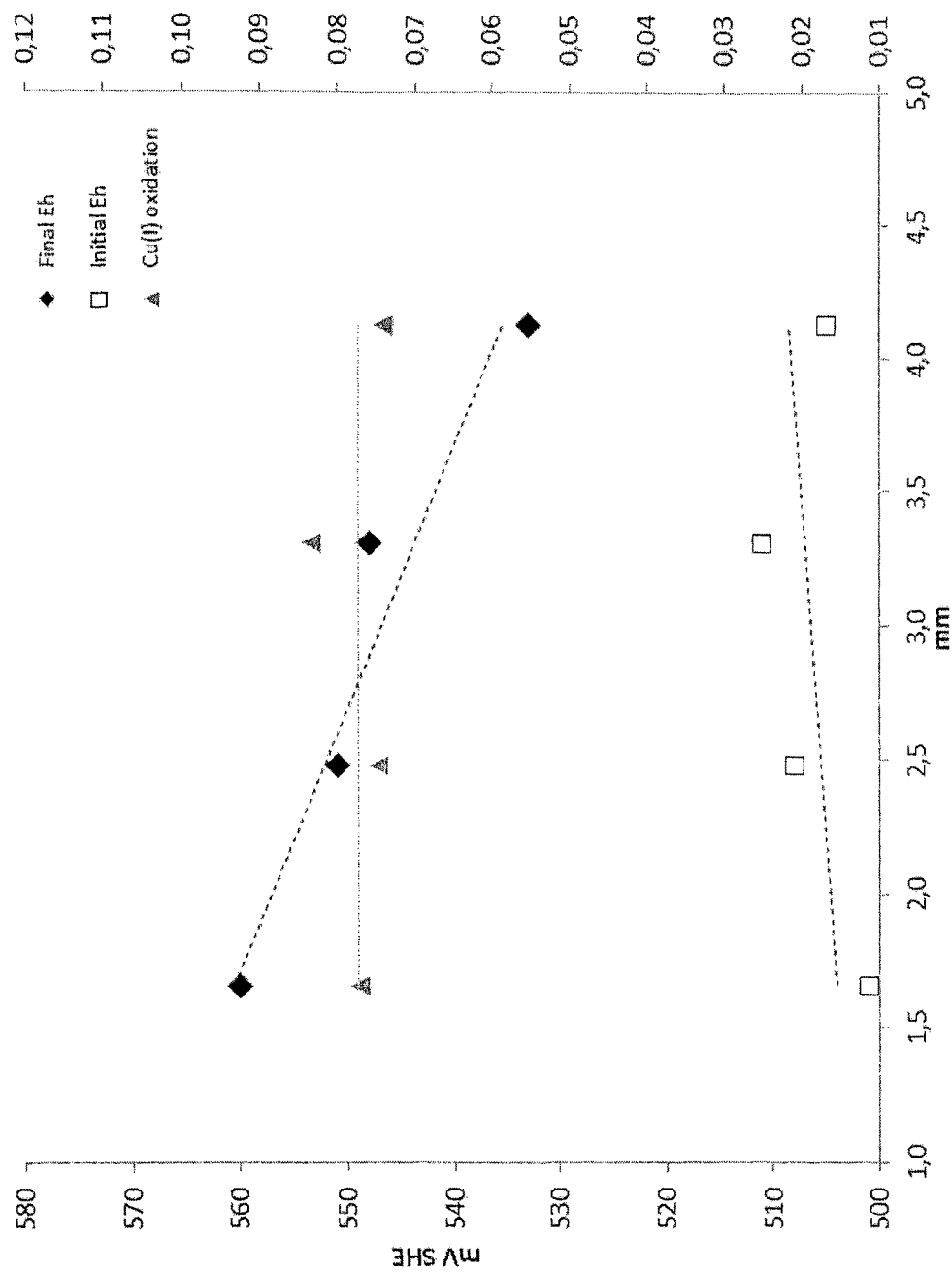
FIG. 12 shows initial and final Eh measurements as a function of solution layer thickness.
Figure 13:
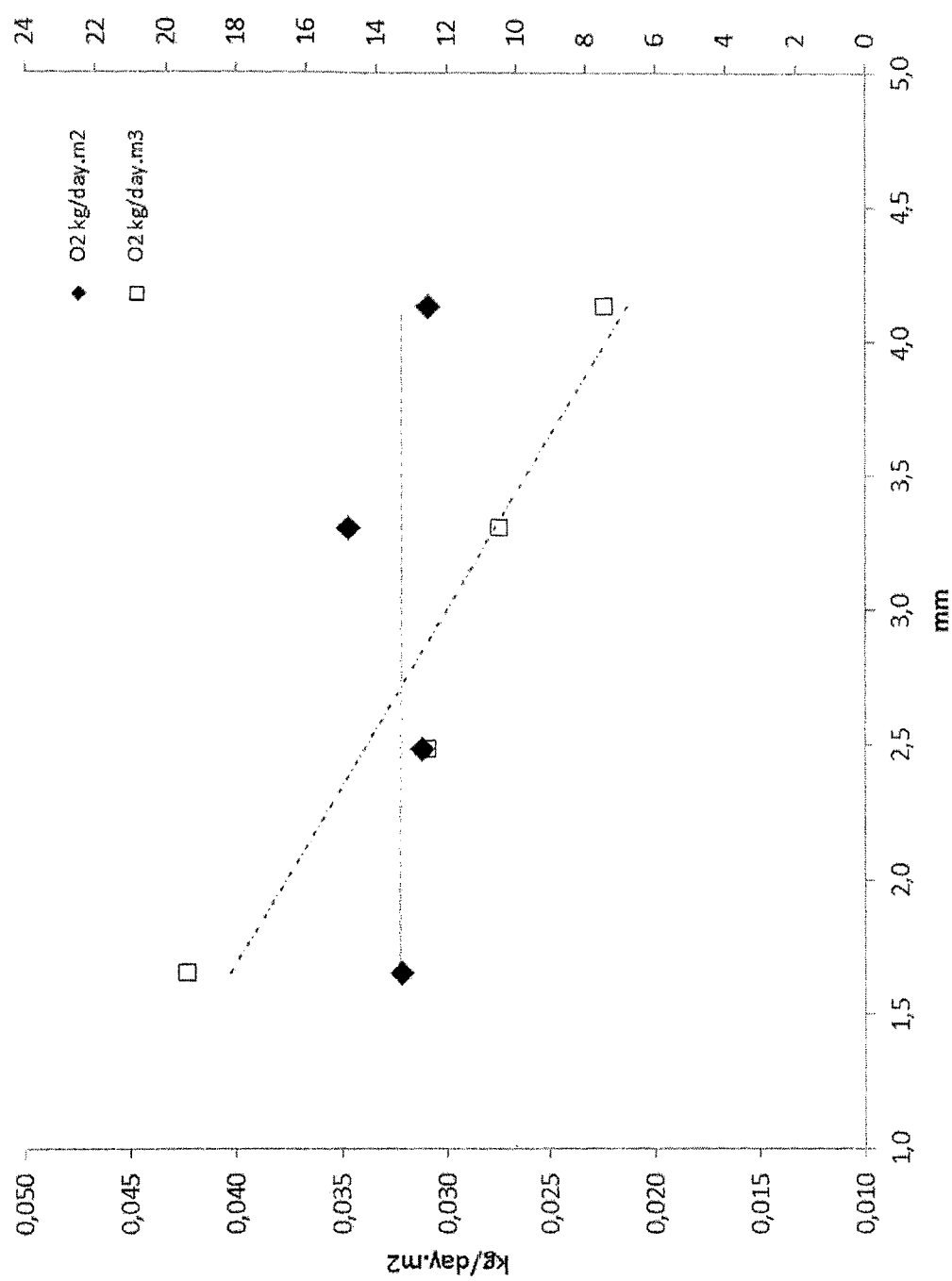
FIG. 13 illustrates oxygen transfer rate as a function of solution to air surface area and working volume.

Four separate copper (I) oxidation data sets were produced, each at an increased volume of acidified solution containing a fixed starting concentration of copper (I) and 150 g/L chloride ions added to a large flat tray with known surface area. The larger volume in each test corresponds to an increase in solution layer thickness of between 1.5 and 4.5 mm. The oxidation tests were conducted at 20° C. and a system pressure of 1 atmosphere system pressure. The solution potential was measured over time as an indication of copper oxidation. The oxidation time (1.5 hours) was limited such that the solution potential remained between 500 and 580 mV SHE. The initial and final Eh measurements are presented in FIG. 12. The copper oxidation rates in mass over time are also shown. These remained constant with increasing volume or surface thickness while the final solution potential decreased. The copper oxidation rate data was used to calculate the oxygen transfer rate as a function of solution/air surface area (kg/day·m$^2$) and working volume (kg/day·m$^3$) (FIG. 13). The amount or mass of copper oxidised in the particular system was limited by the oxygen transfer rate. The decrease in the volumetric oxygen transfer rate essentially caused a decreasing Cu(II)/Cu(I) ratio with increased volume or layer thickness, thus resulting in a slower increase in the solution potential.

Figure 14:
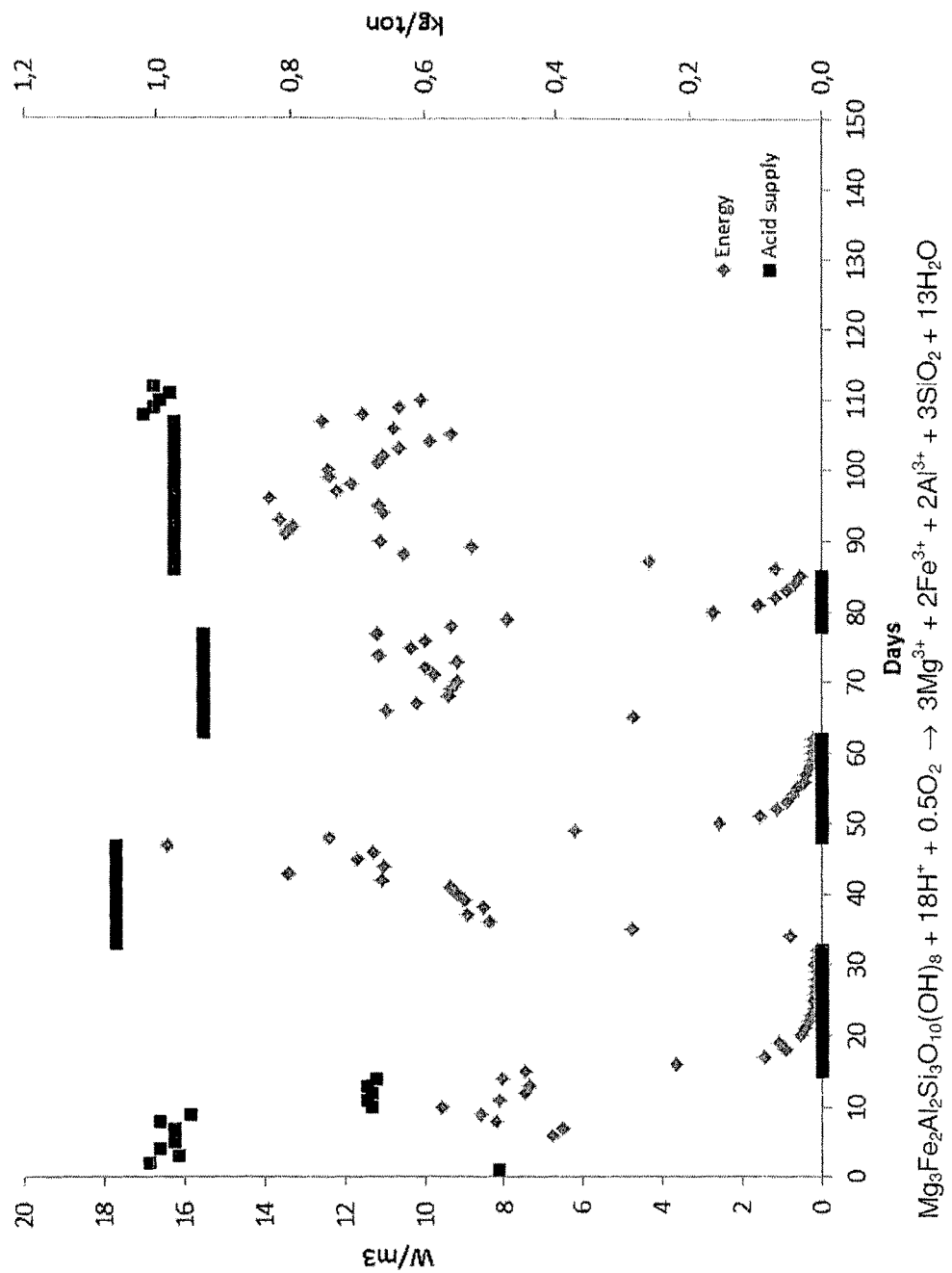
FIG. 14 depicts energy generated from a chlorite mineral as a function of acid supply.

The heat generation capability of a chlorite mineral containing ore (90% chalcopyrite, 0.3 wt. % CuT and particle size of passing 80% 1.5") was evaluated under the conditions stipulated herein. The following figures correspond to data generated in a heap leach simulation apparatus of the kind described in WO/2005/061741. The ore loaded in the simulation column or apparatus was subjected to multiple irrigation (10 days) and resting (15 days) steps with an overall leach cycle solution volume to ore ratio of below 0.6 m$^3$/ton. The leach solution used during the irrigation cycles contained 100 g/l sulphuric acid, 150 g/l chloride ions, 1 g/l soluble iron and 5 g/l copper (II). The energy (watts per cubic meter ore) generated from the chlorite mineral during the irrigation cycles was calculated using the magnesium dissolution rate and plotted against the acid supply in kilograms per ton of ore (FIG. 14). A high acid (100 g/l H$_2$SO$_4$ in rinse solution) rinse cycle was applied after day 85.

Figure 15:
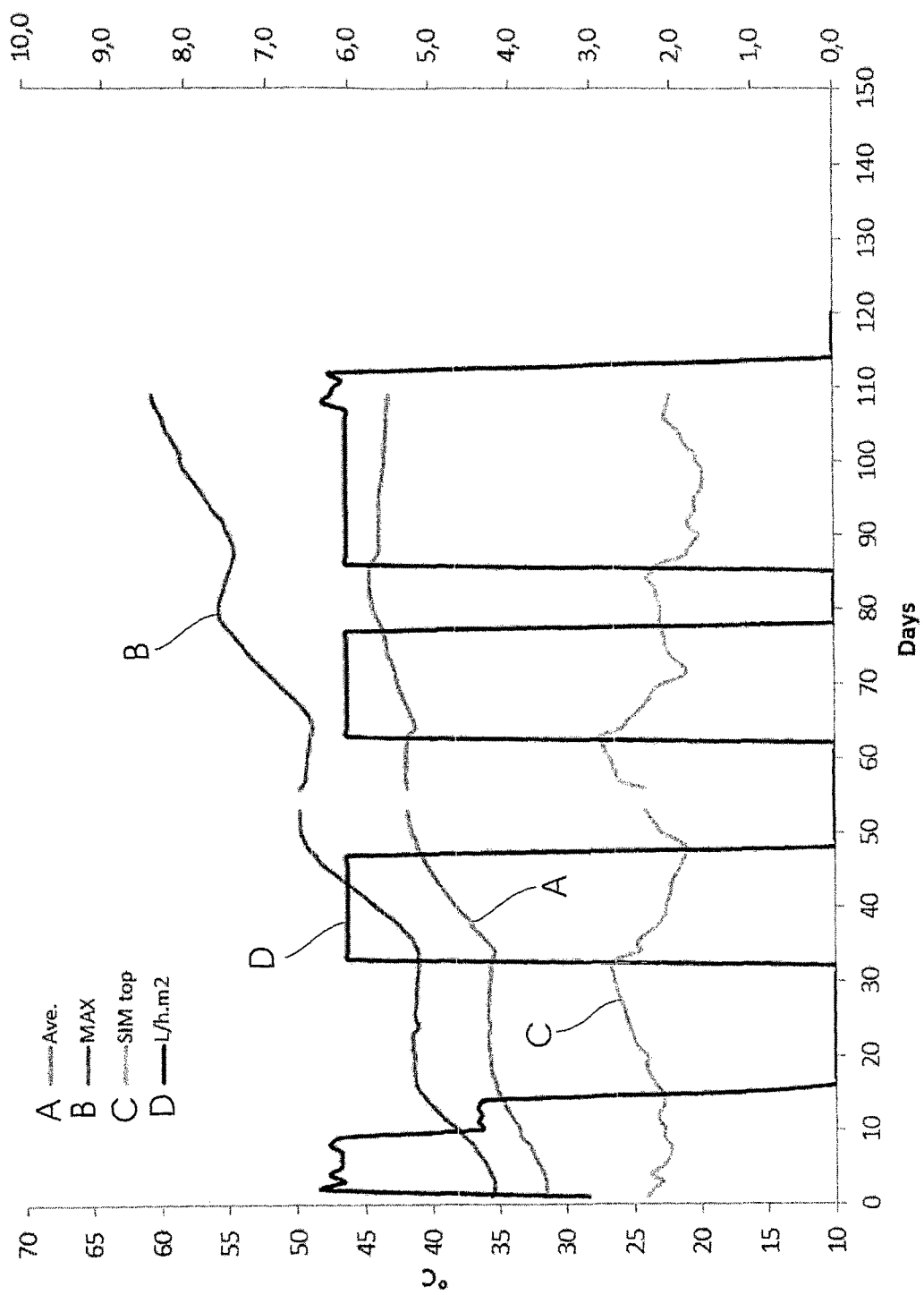
FIG. 15 shows temperatures in a test column as a function of time and irrigation rates.
Figure 16:
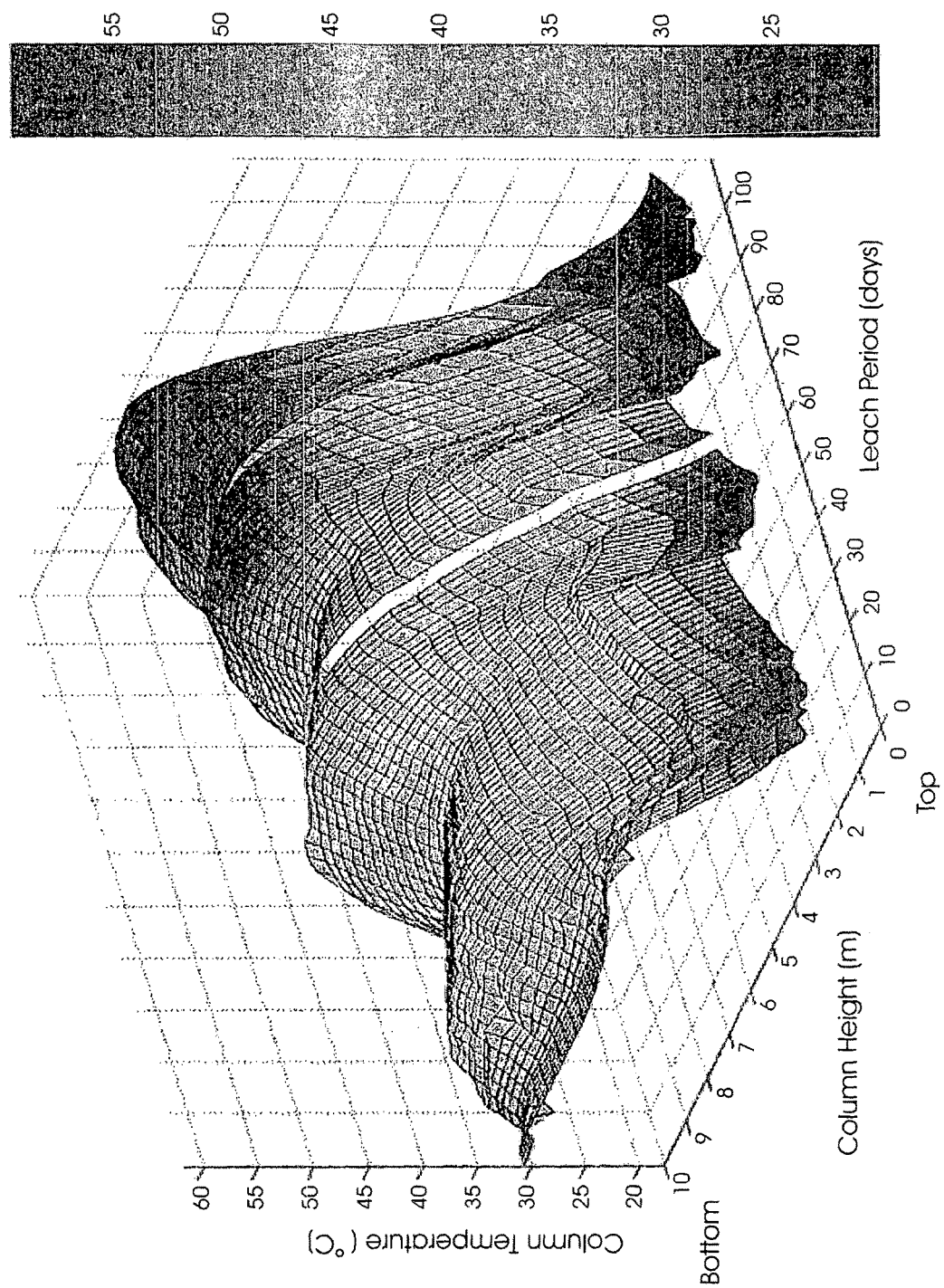
FIG. 16 is a representation of a temperature profile from a top to a bottom of a column over leach and rinse cycles.

The average, maximum and top section temperature values obtained in the column are presented in FIG. 15 and plotted with the irrigation rate. It is apparent that the temperature increase was obtained during the irrigation cycle only and is a function of acid supply (FIG. 14). The temperature profiles from column top to bottom are shown over the leach and rinse cycles in FIG. 16. The heat was mostly conserved to the middle of the column and a constant aeration rate of 0.03 Nm$^3$/h per ton of ore was applied.

Figure 17:
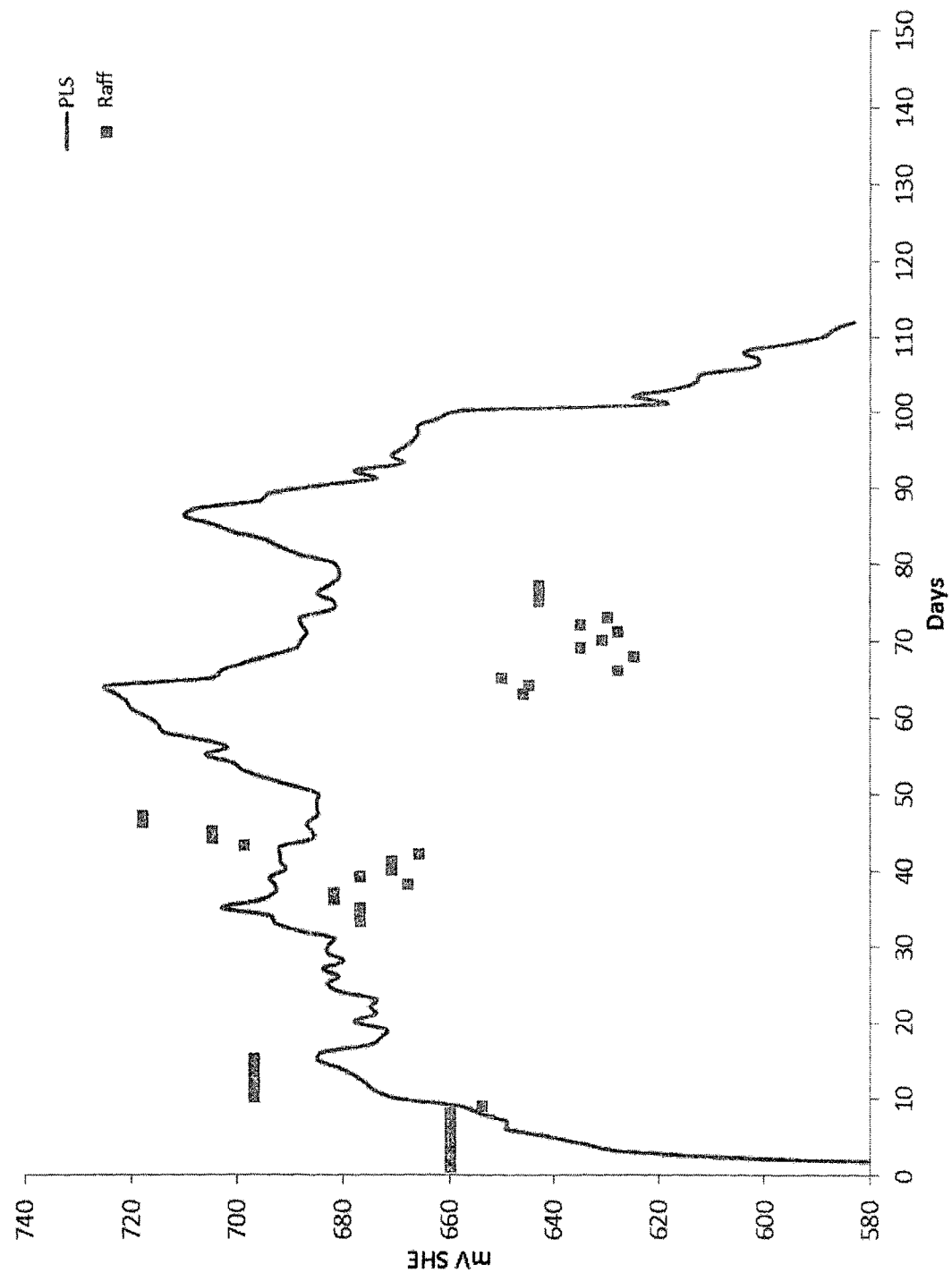
FIG. 17 shows solution potential values of a raffinate and a PLS as a function of time.

The solution potential values of the raffinate and PLS are shown in FIG. 17.

Figure 18:
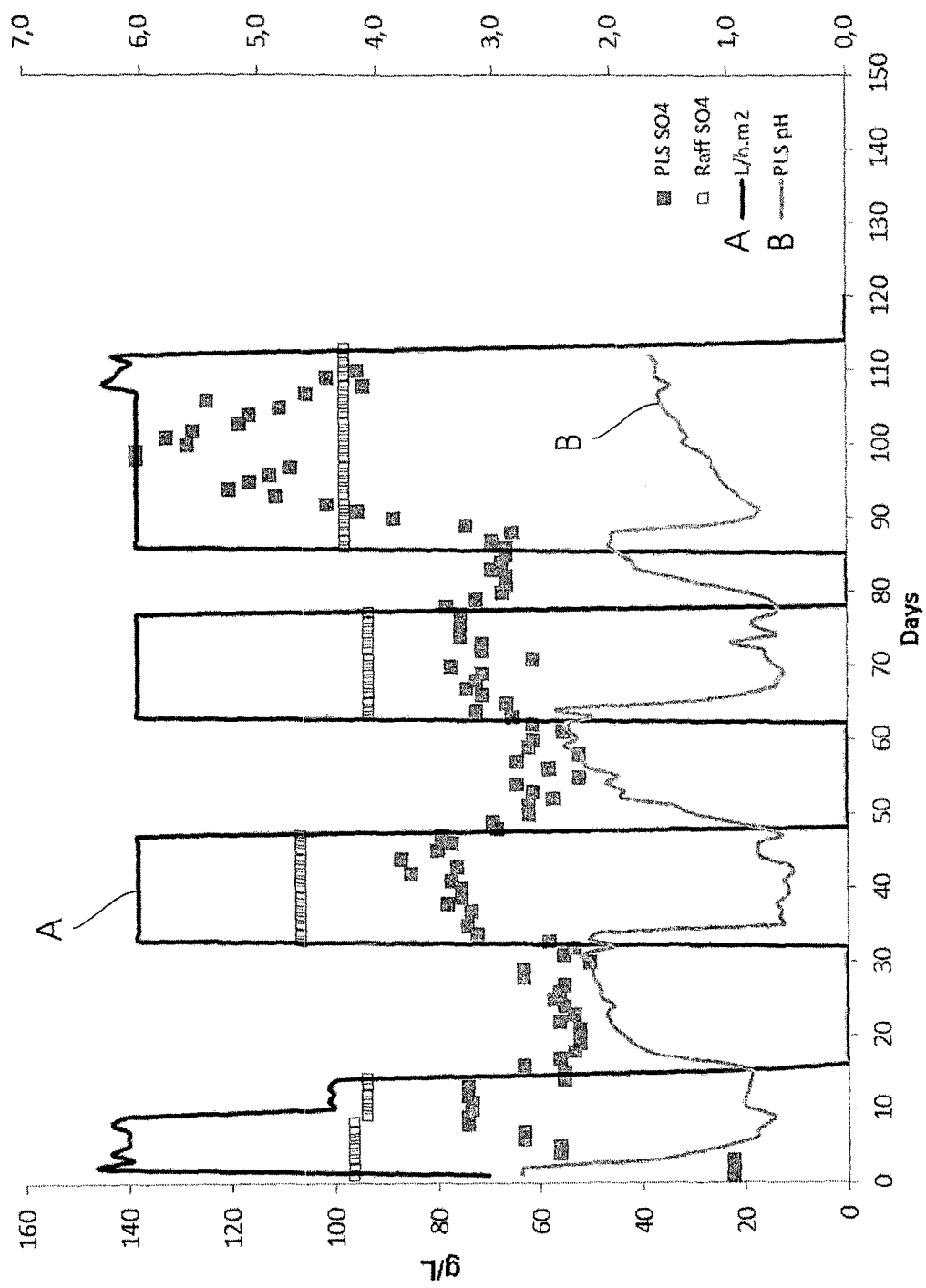
FIG. 18 shows sulphate concentration in a raffinate and in a PLS.

Sulphate precipitation is apparent with the difference in raffinate and PLS sulphate concentration, which is particularly significant during the resting steps as seen from the drainage pH exceeding pH1.5 (FIG. 18). The high acid concentration in the rinse solution (same as in the raffinate) had an unwanted effect of solubilising the precipitated sulphate compounds, which can be seen from the significant increase in the PLS sulphate concentration above the rinse solution sulphate concentration (FIG. 18). It is therefore stipulated herein that the rinse solution may contain less sulphuric acid than the solution applied to the ore during the irrigation cycles (raffinate) in order to manage the pH in such manner that the sulphate precipitate is not solubilised.

Figure 19:
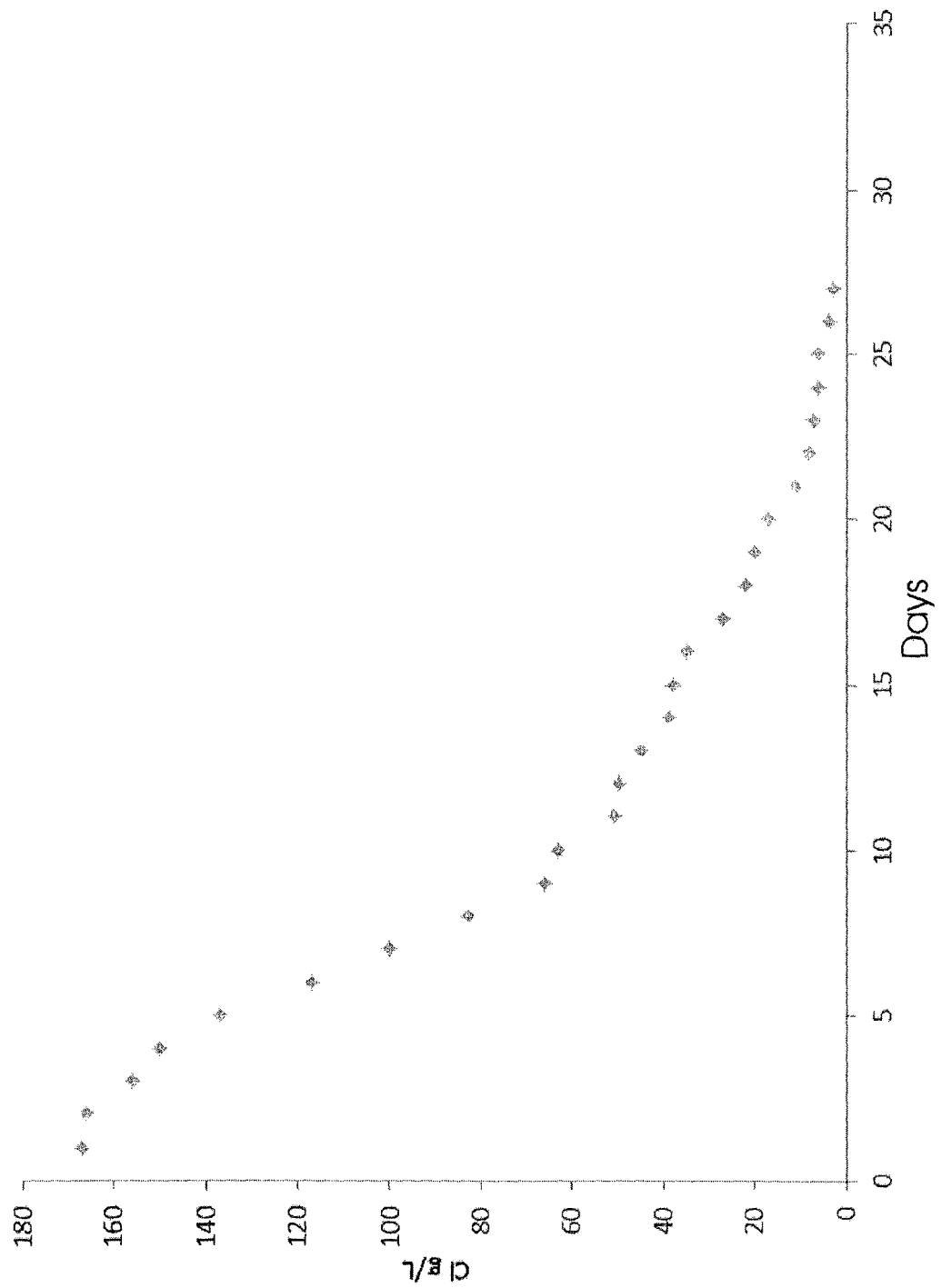
FIG. 19 shows chloride ion concentration values in the PLS during a rinse step.

The rinse solution employed contained less than 1 g/L chloride ions. The chloride ion concentration values in the PLS during the rinse step are shown in FIG. 19. A chloride ion rinse efficiency exceeding 90% was obtained in approximately 30 days.

Figure 20:
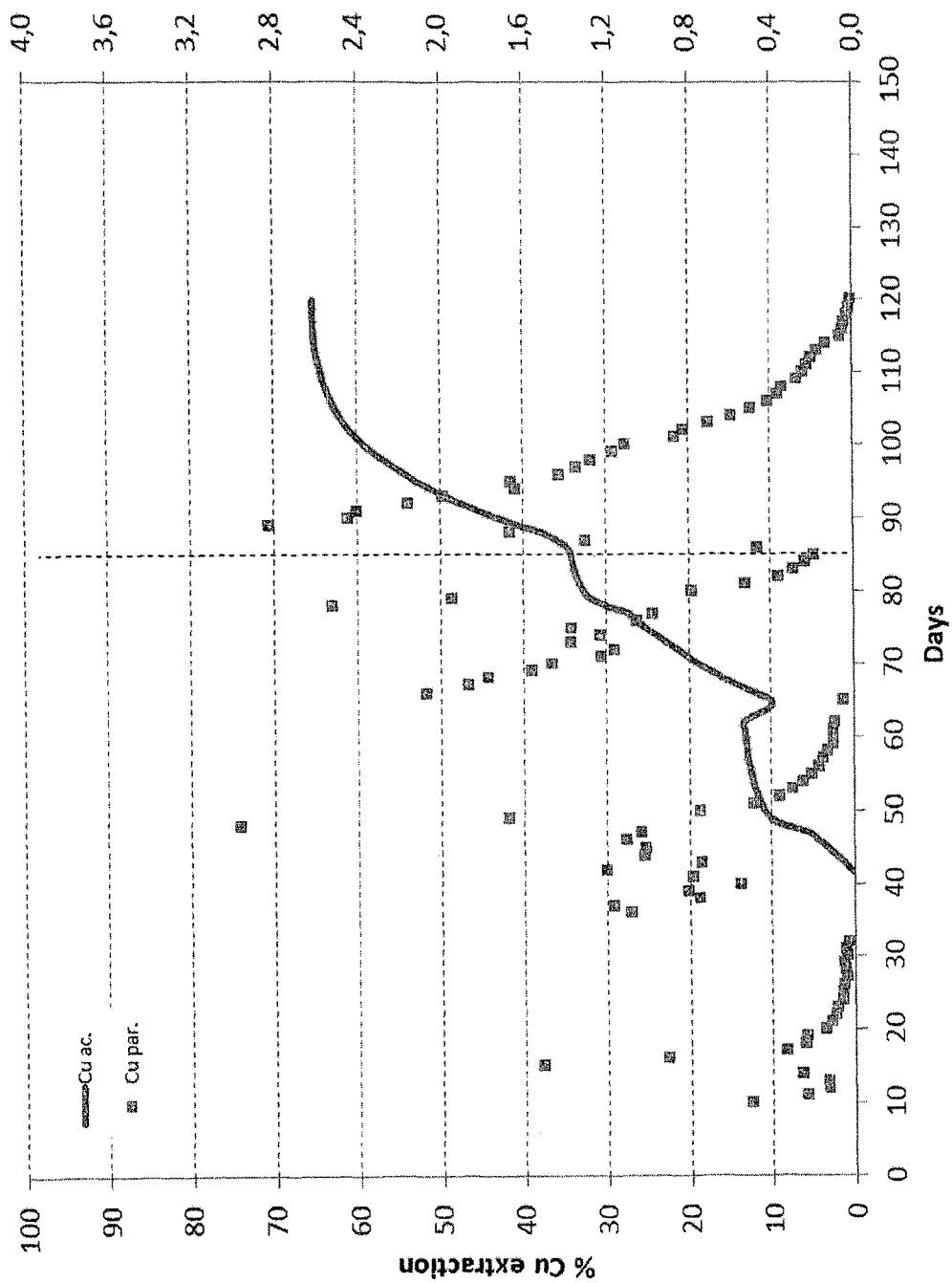
FIG. 20 shows partial and accumulated copper extraction values from chalcopyrite on a time basis.

The partial and accumulative copper extractions from the chalcopyrite containing ore are presented in FIG. 20; exceeding 60% in 120 days including the rinse cycle (day 85 to 120). Due to the large copper inventory generated within the ore bed during the irrigation and resting steps, the rinse cycle is considered critical in recovering the copper and, as stipulated herein, should be completed within 50 days for best performance, but is not limited to this period.

Figure 21:
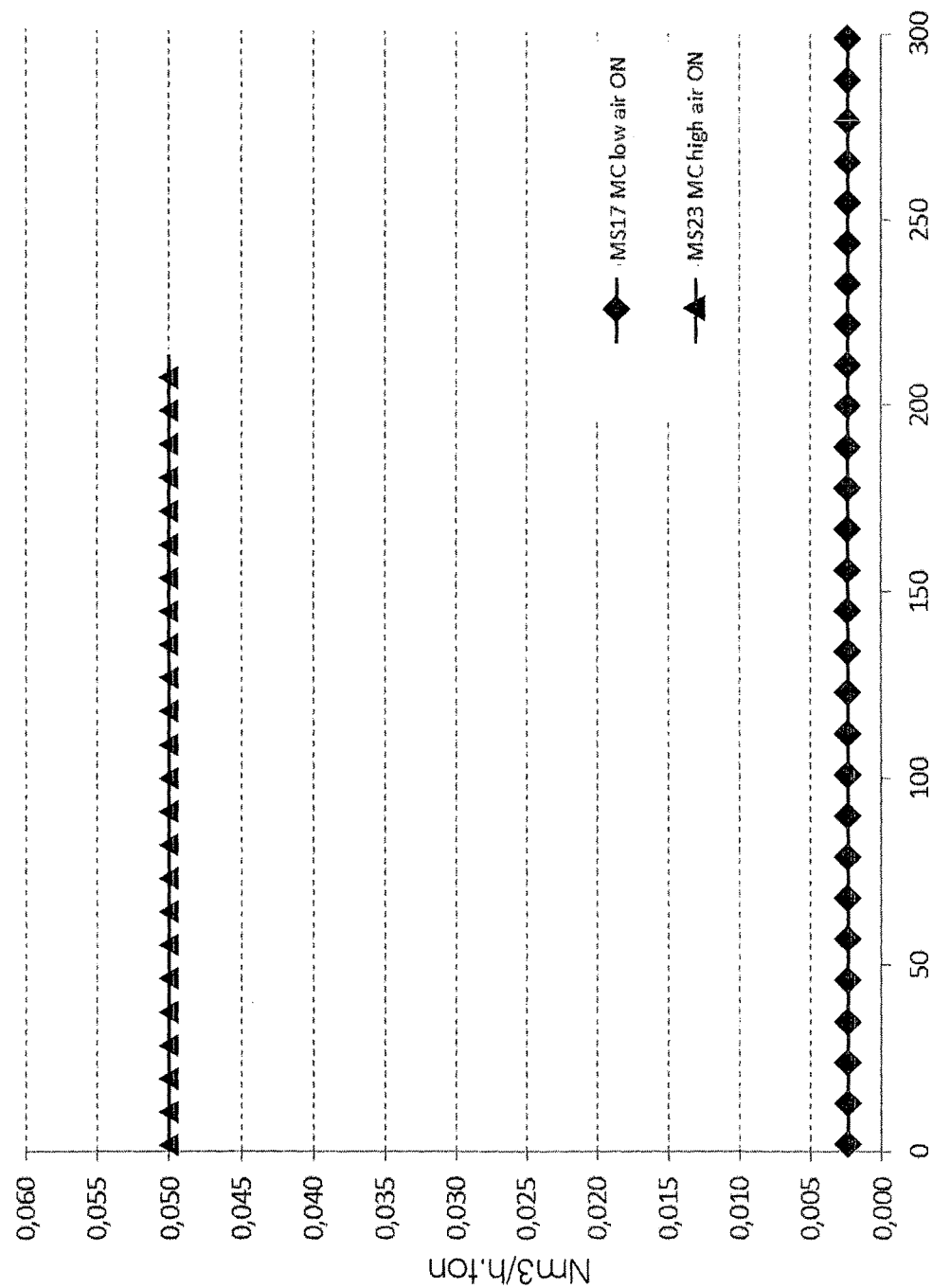
FIG. 21 illustrates aeration rates on a time basis during rest and irrigation steps.

The oxygen requirement for the concept described herein was evaluated in large scale column leach systems employing inlet and outlet oxygen analyses on crushed ore (passing 80% ½") containing 75% chalcopyrite and 25% secondary sulphide minerals with a high total copper grade of 0.8 wt. %. The column leach tests were maintained at a constant ore temperature of 25° C. The ore was agglomerated and loaded followed by a 48 day resting step and subsequent 10 day irrigation and 15 day resting steps. A low (0.002 Nm$^3$/h·ton) and high (0.05 Nm$^3$/h·ton) aeration rate were employed in two of the column tests during these resting and irrigation steps (FIG. 21).

Figure 22:
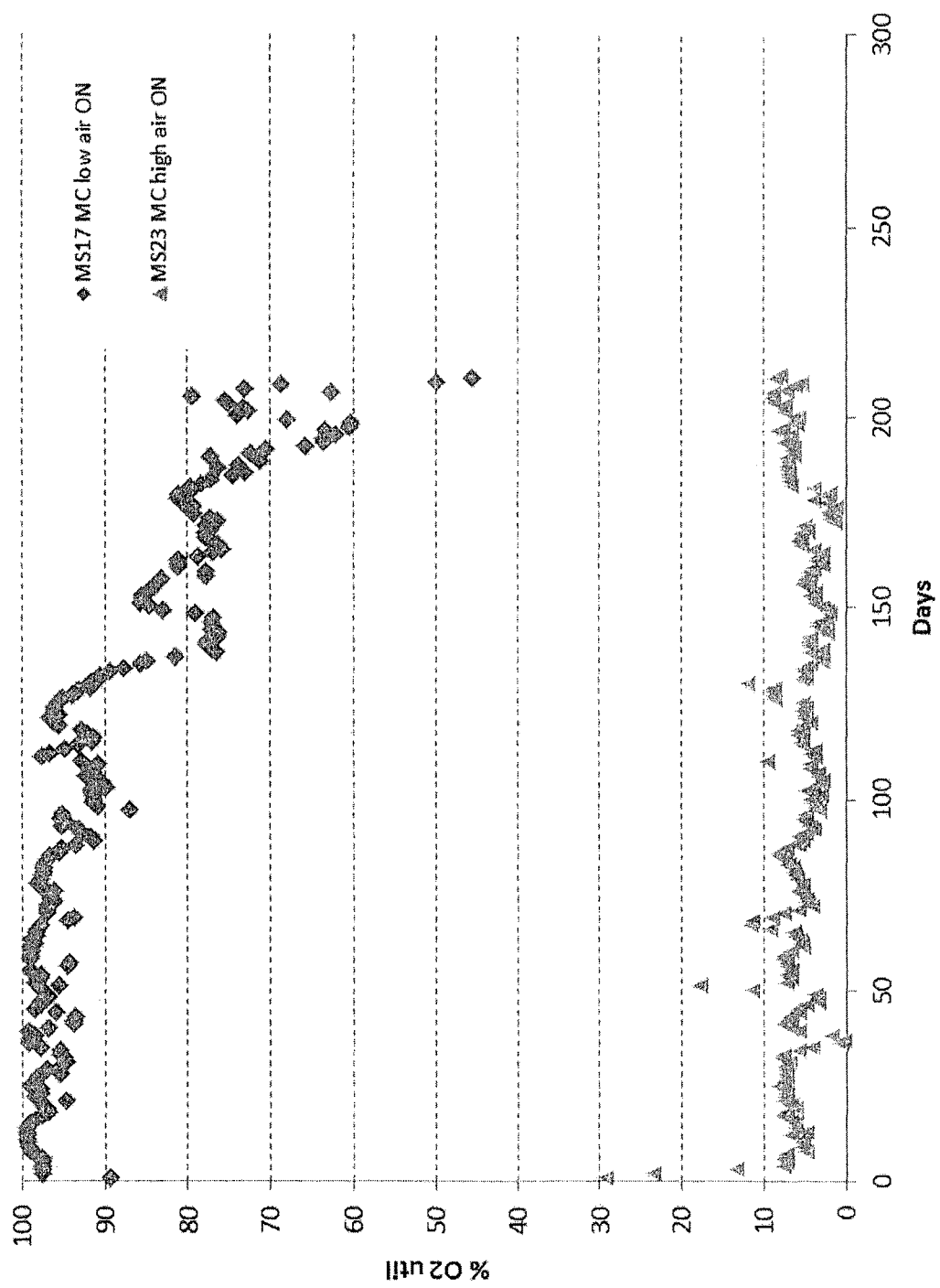
FIG. 22 depicts oxygen utilization values.
Figure 23:
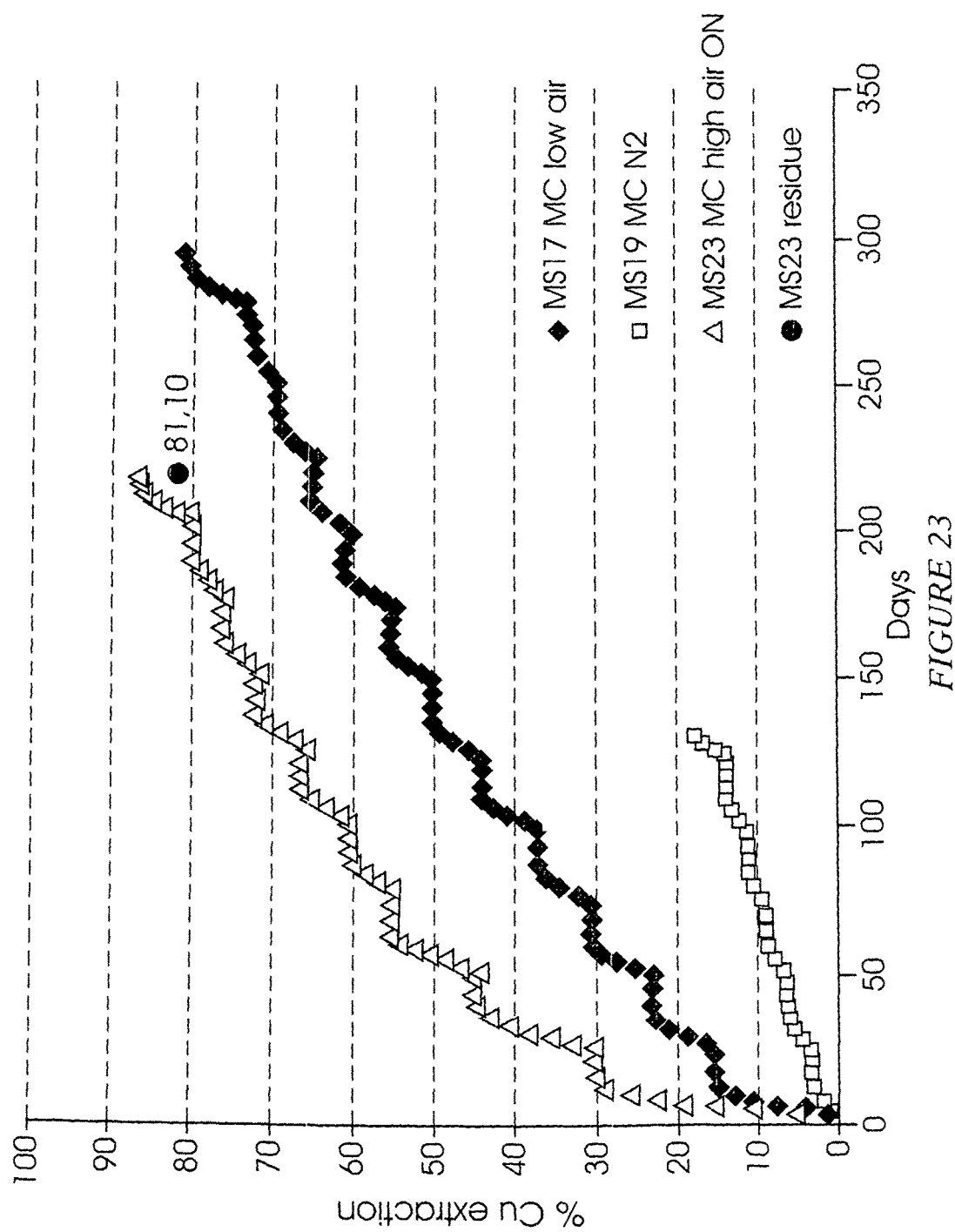
FIG. 23 shows copper extraction rates.

The oxygen utilisation values for sulphide oxidation in two systems are expressed as daily (partial) percentage difference between the inlet and outlet oxygen in FIG. 22. The low aeration condition was starved of oxygen (>90% utilisation) and reflected in a lower copper extraction rate from the sulphide minerals compared to the high aeration condition. FIG. 23 shows the copper extraction rates since the start of the first irrigation step after the first resting step of 45 days. A column leach test operated under nitrogen was also included, which showed a significant lower copper extraction rate than the low aeration condition. The high aeration condition showed a low oxygen utilisation of approximately 5% during the time of operation. Aeration rates promoting an oxygen utilisation of between 25 and 50% can be considered as best practise for commercial heap leaching. An aeration rate of 0.01 Nm$^3$/h·ton can thus be considered as adequate for this particular ore under conditions described.

Figure 24:
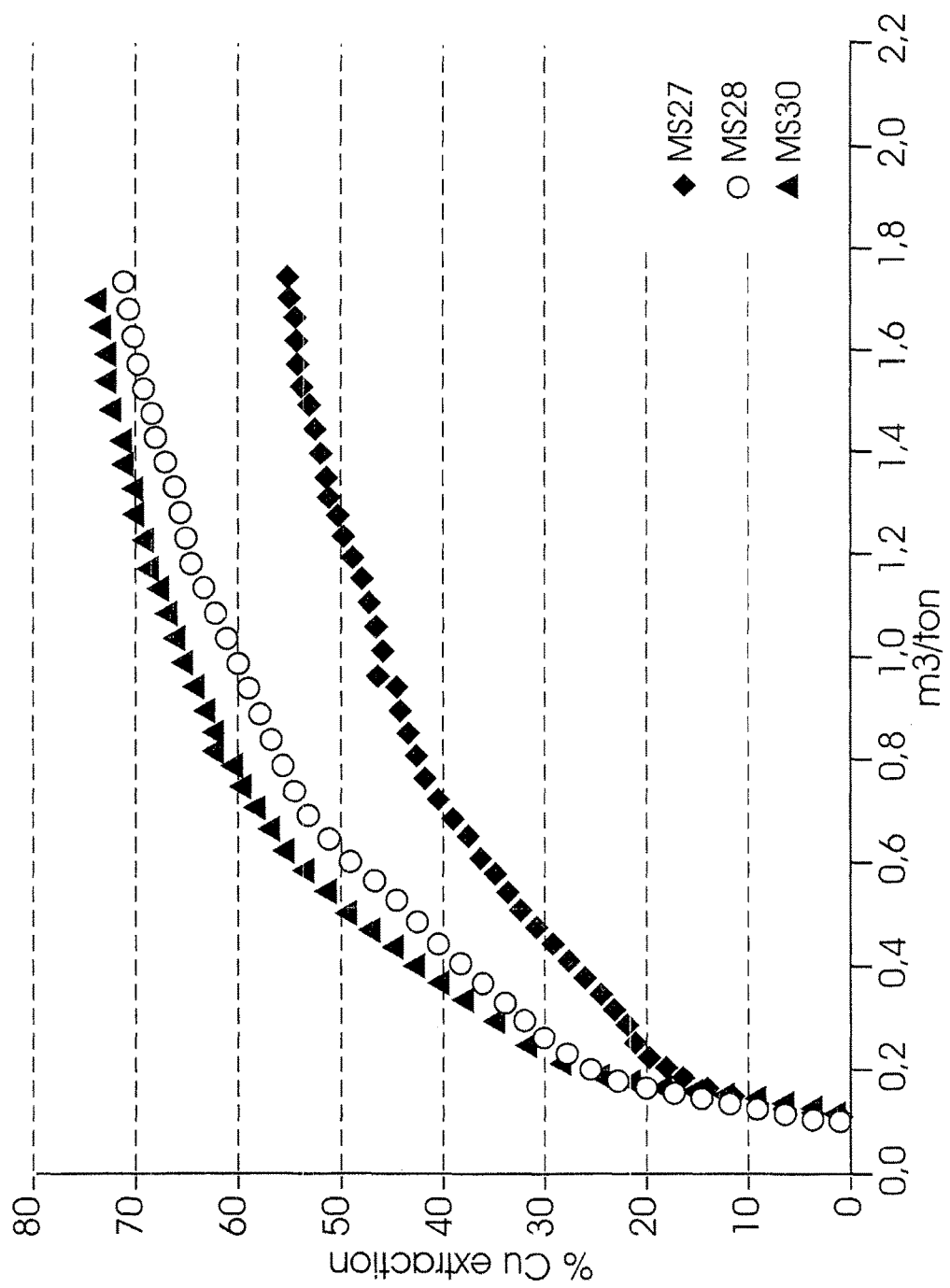
FIG. 24 shows copper extraction rates vs. solution/ore ratio.
Figure 25:
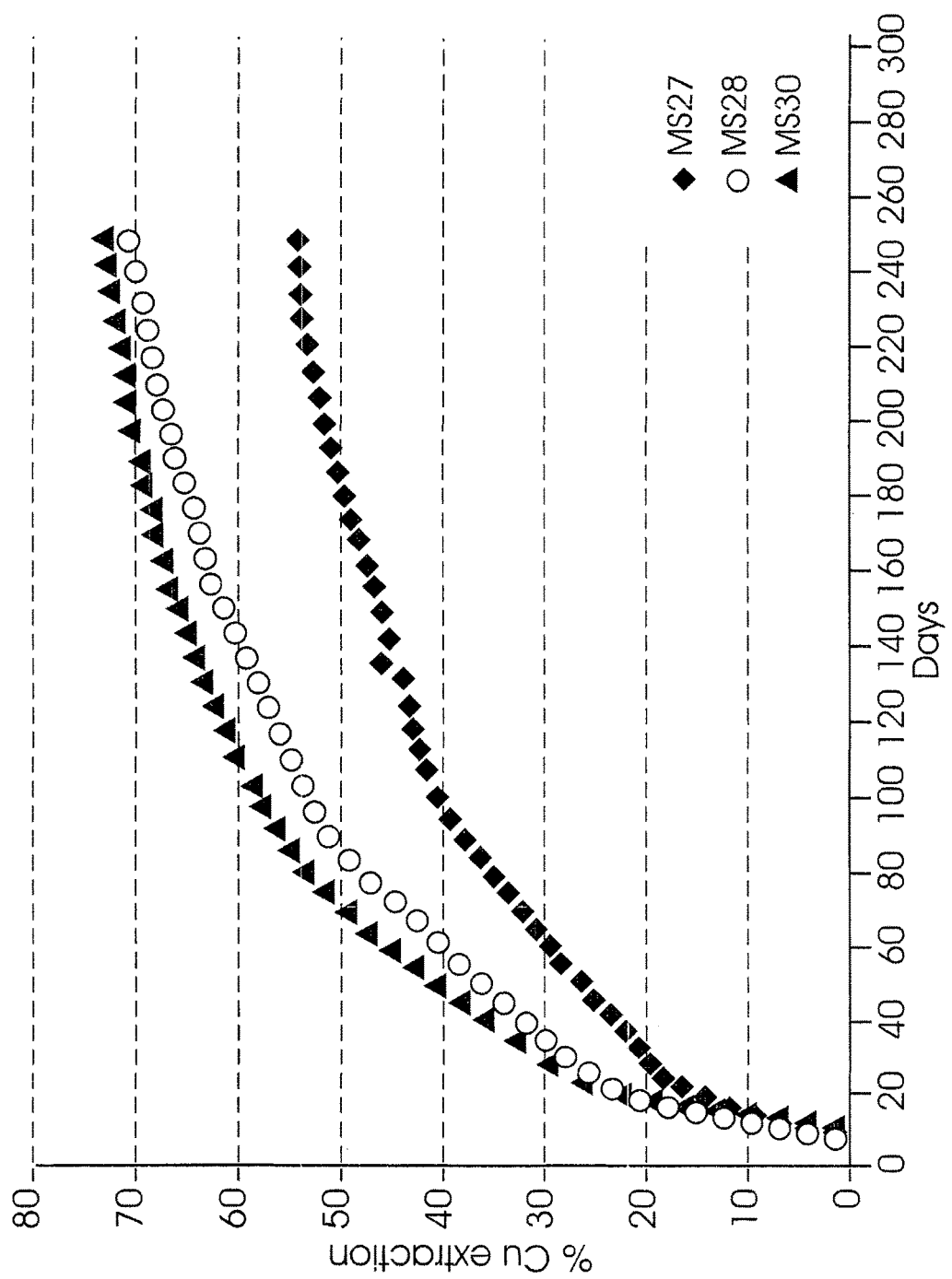
FIG. 25 shows copper extraction rates over time.
Figure 26:
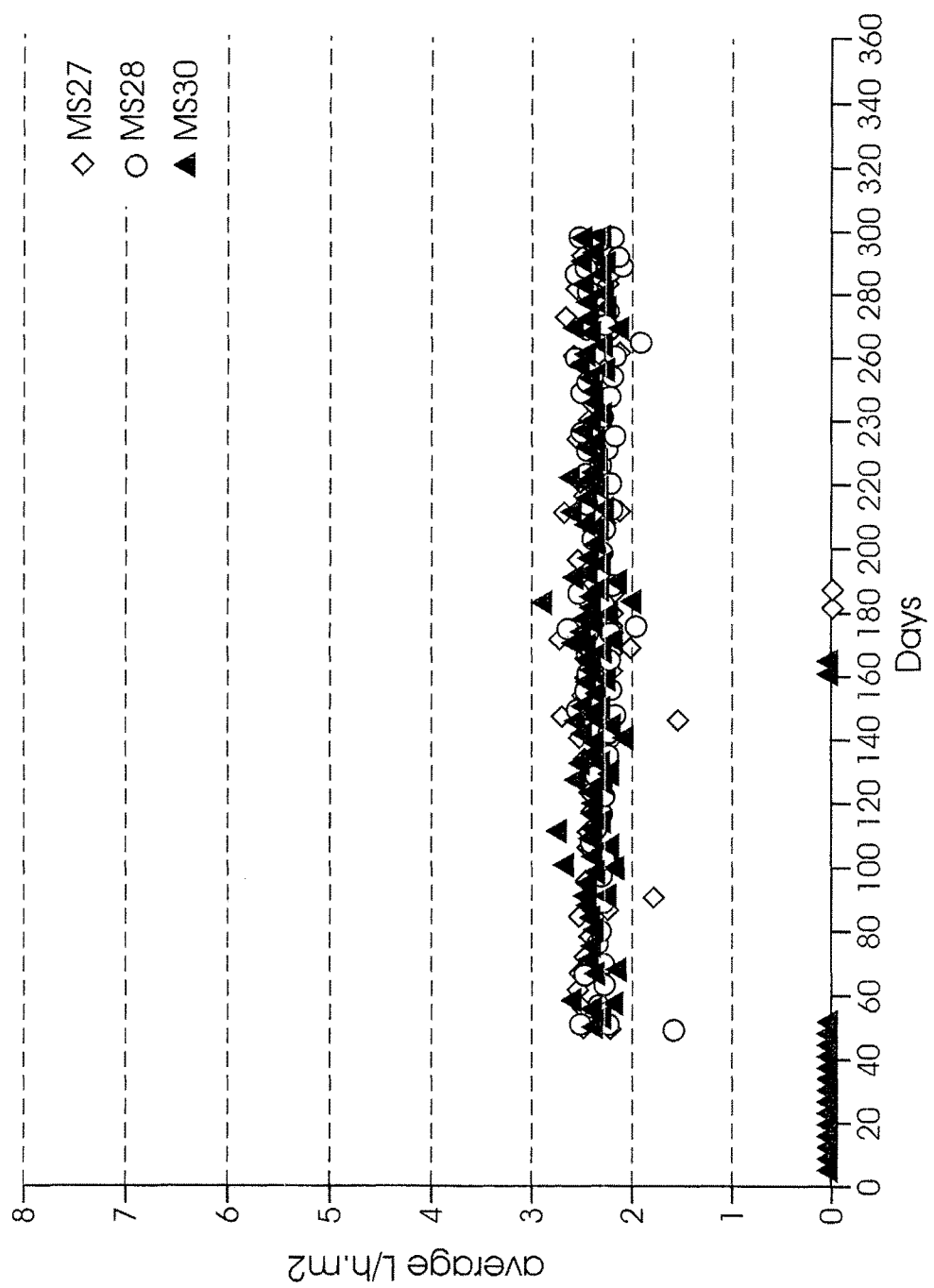
FIG. 26 illustrates daily average irrigation rates.
Figure 27:
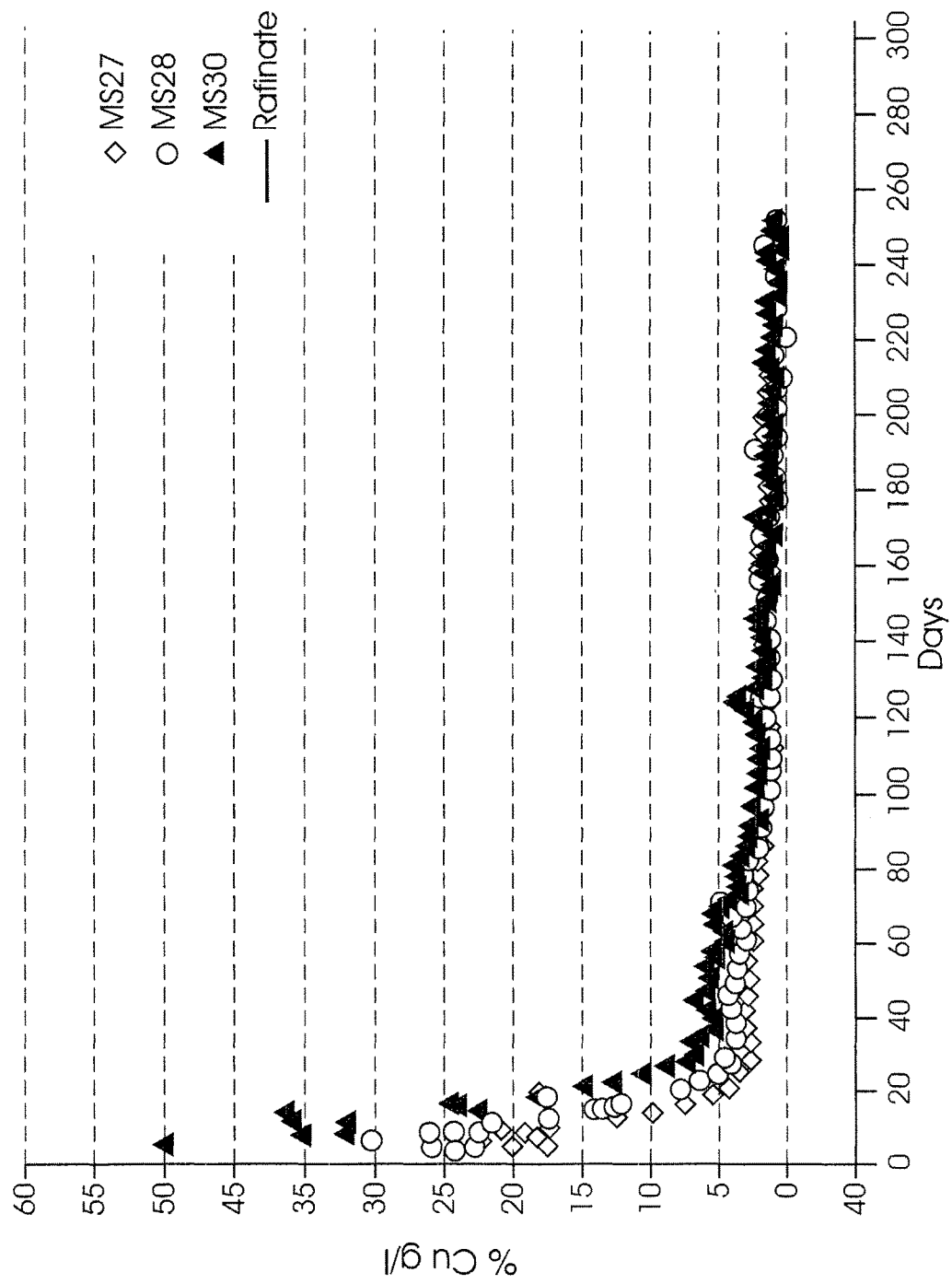
FIG. 27 shows copper concentrations in PLS and raffinate.
Figure 28:
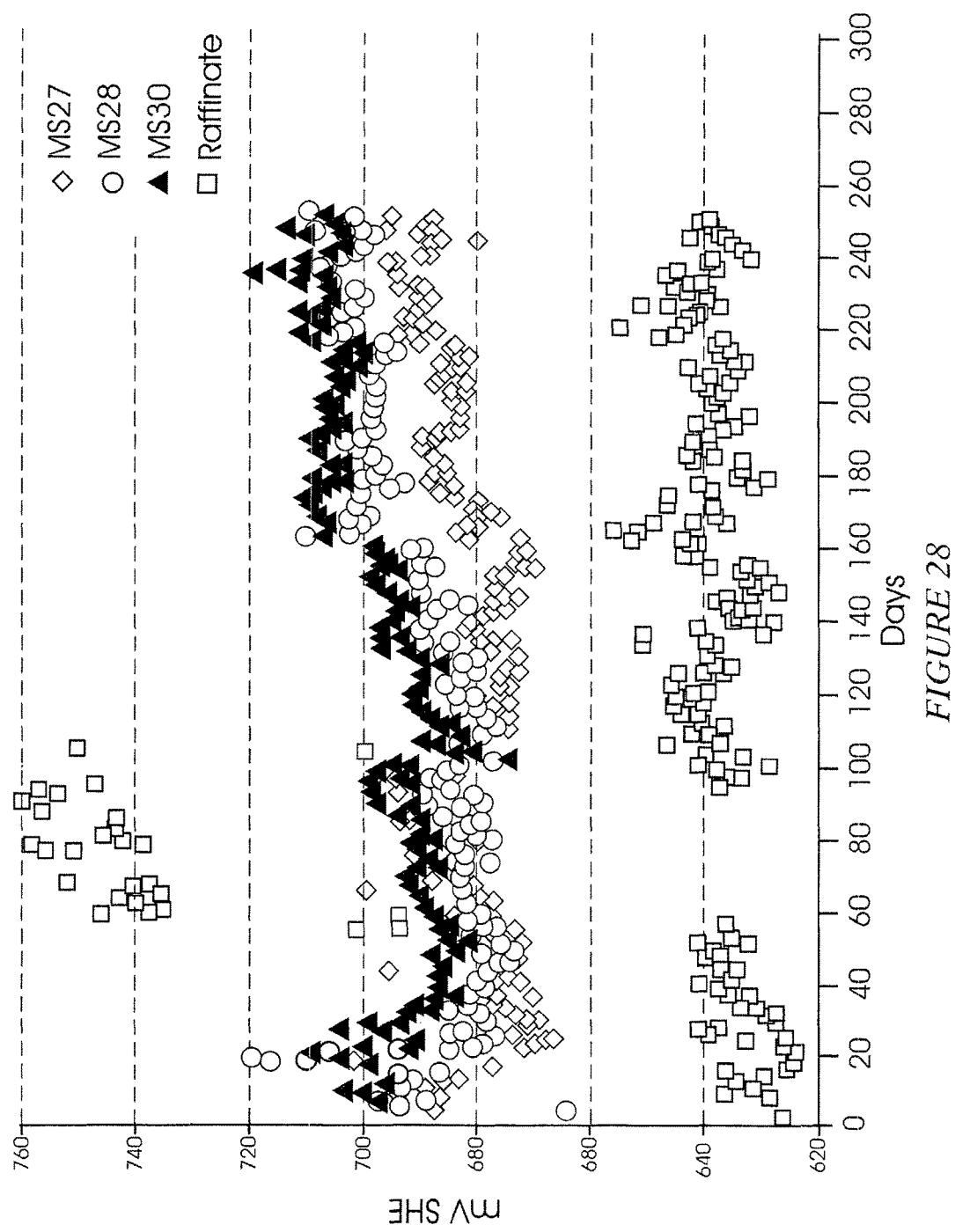
FIG. 28 shows PLS and raffinate solution potential values of a raffinate and a PLS as a function of time.

FIG. 24 presents the accumulated solution application volume to ore mass ratio (expressed as m$^3$/ton) over time for three six meter high column leach tests targeting copper extraction (%) from three different crushed ore (passing 80% ½") samples containing above 88% chalcopyrite (remaining copper present as secondary sulphide minerals) with a total copper grade of between 0.45-0.65 wt. %. The copper extractions achieved over time for the three columns tests are shown in FIG. 25. The ore samples loaded in the columns were agglomerated with concentrated acid and solution containing 150 g/l chloride ions followed by a 50 day resting step for each column test. The columns tests were maintained at constant temperature of 25° C. after agglomeration. Unless otherwise stipulated, all examples described hereafter were conducted at 25° C. after agglomeration. After the initial 50 day resting step, multiple irrigation steps (10 hours each) and multiple alternating resting steps (14 hours each) were employed for each column test (copper extracted depicted from after day 0 in FIG. 25). A single resting step was followed by a single irrigation step. During the irrigation steps, the solution application rate for each column test was maintained at 6 liters per hour per square meter of ore surface (6 L/h·m$^2$). The irrigation solution ("raffinate") employed during the irrigation steps contained approximately 150 g/L chloride ions prepared from sodium chloride and approximately 20 g/L sulphuric acid. The daily average solution application rates are shown in FIG. 26 from directly after column loading. The columns were aerated at 0.01 Nm$^3$/h·ton during all aforementioned resting and irrigation steps. No rinse cycles were included in the data sets. The copper concentrations in the raffinate and PLS of aforementioned column tests are shown in FIG. 27. The solution potential values (vs. standard hydrogen electrode) in the raffinate and PLS of aforementioned column tests are shown in FIG. 28.

Figure 29:
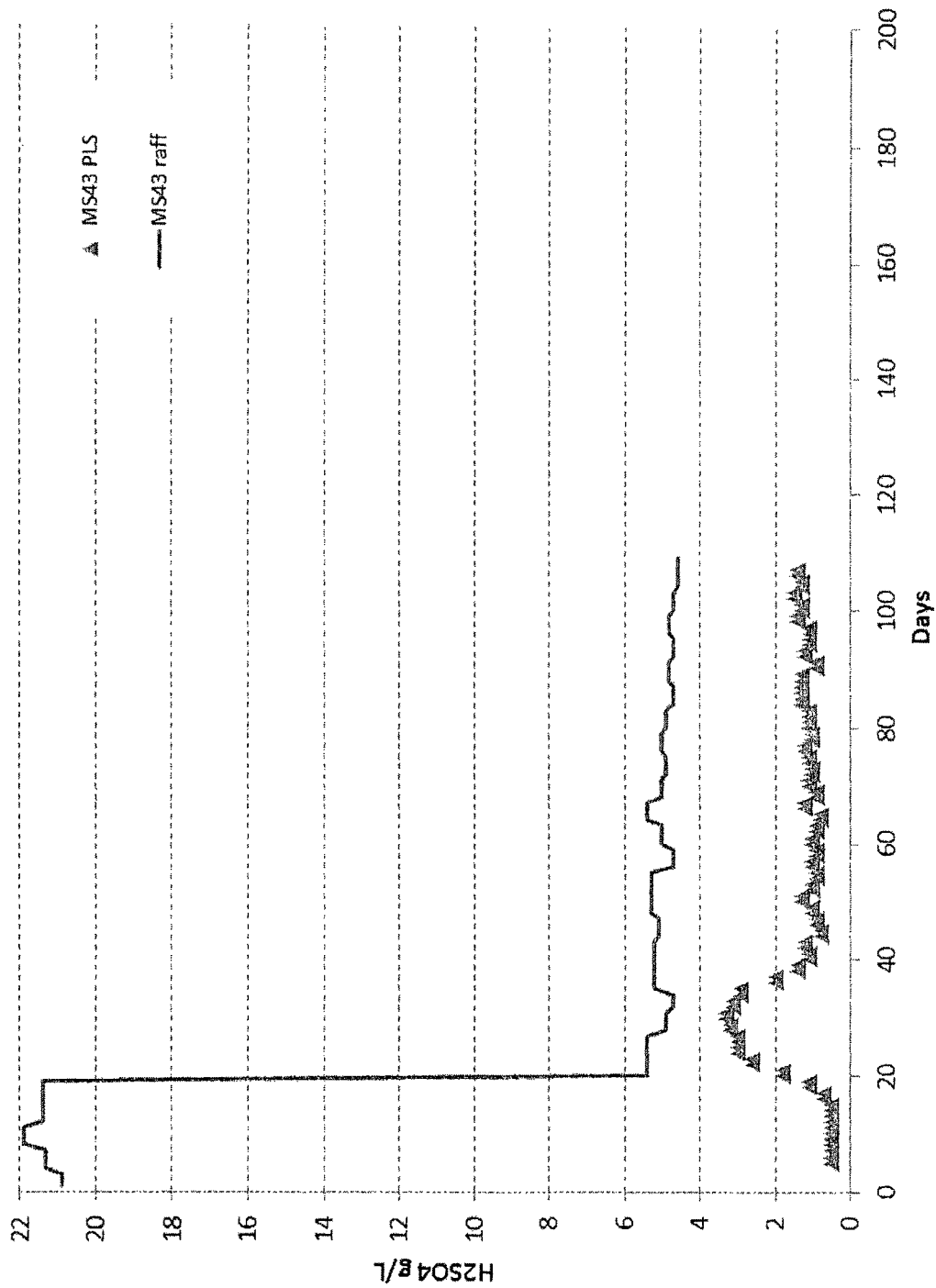
FIG. 29 shows PLS and raffinate acid concentrations.
Figure 30:
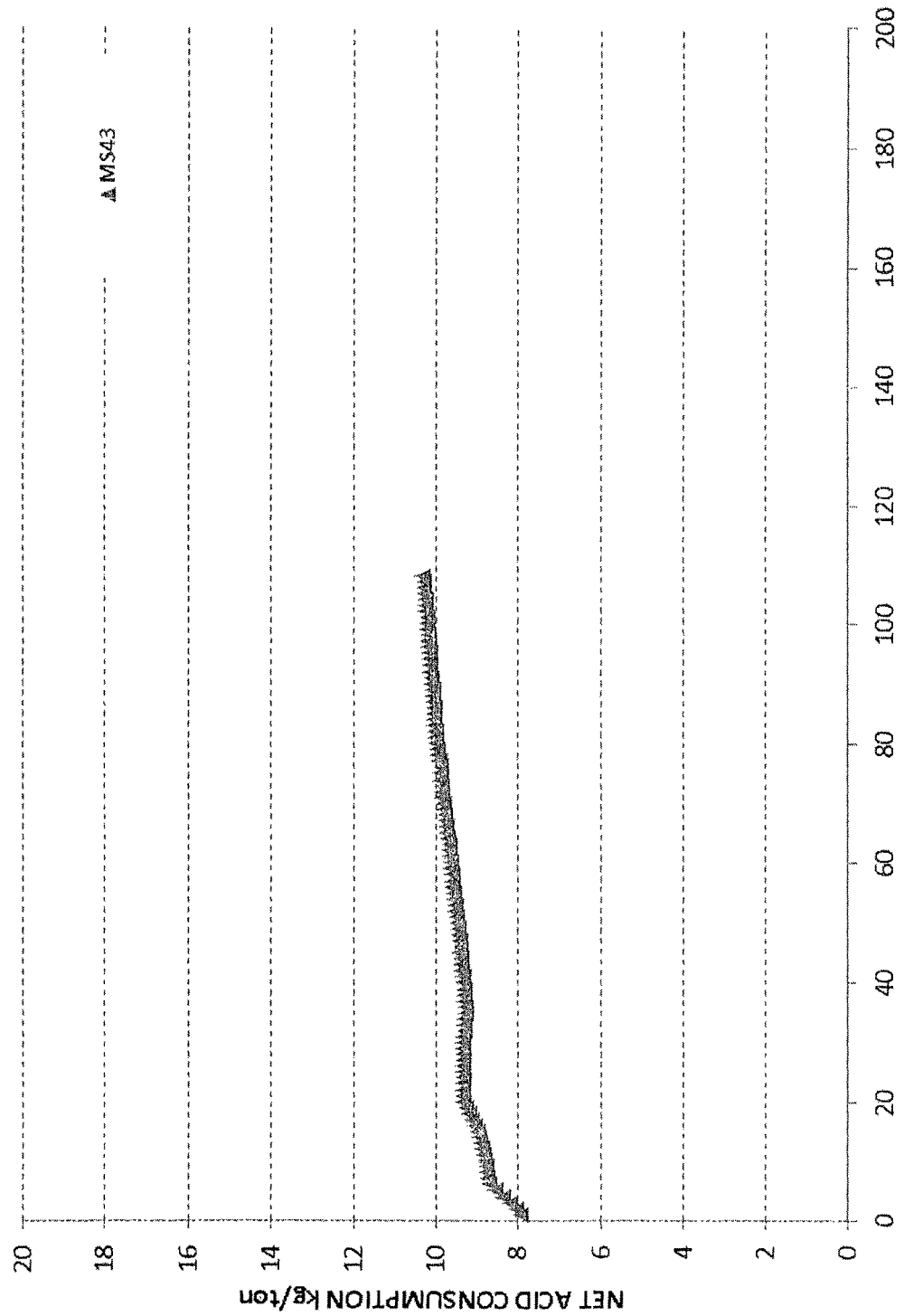
FIG. 30 presents the net acid consumption achieved under acid concentrations showed in FIG. 29.
Figure 31:
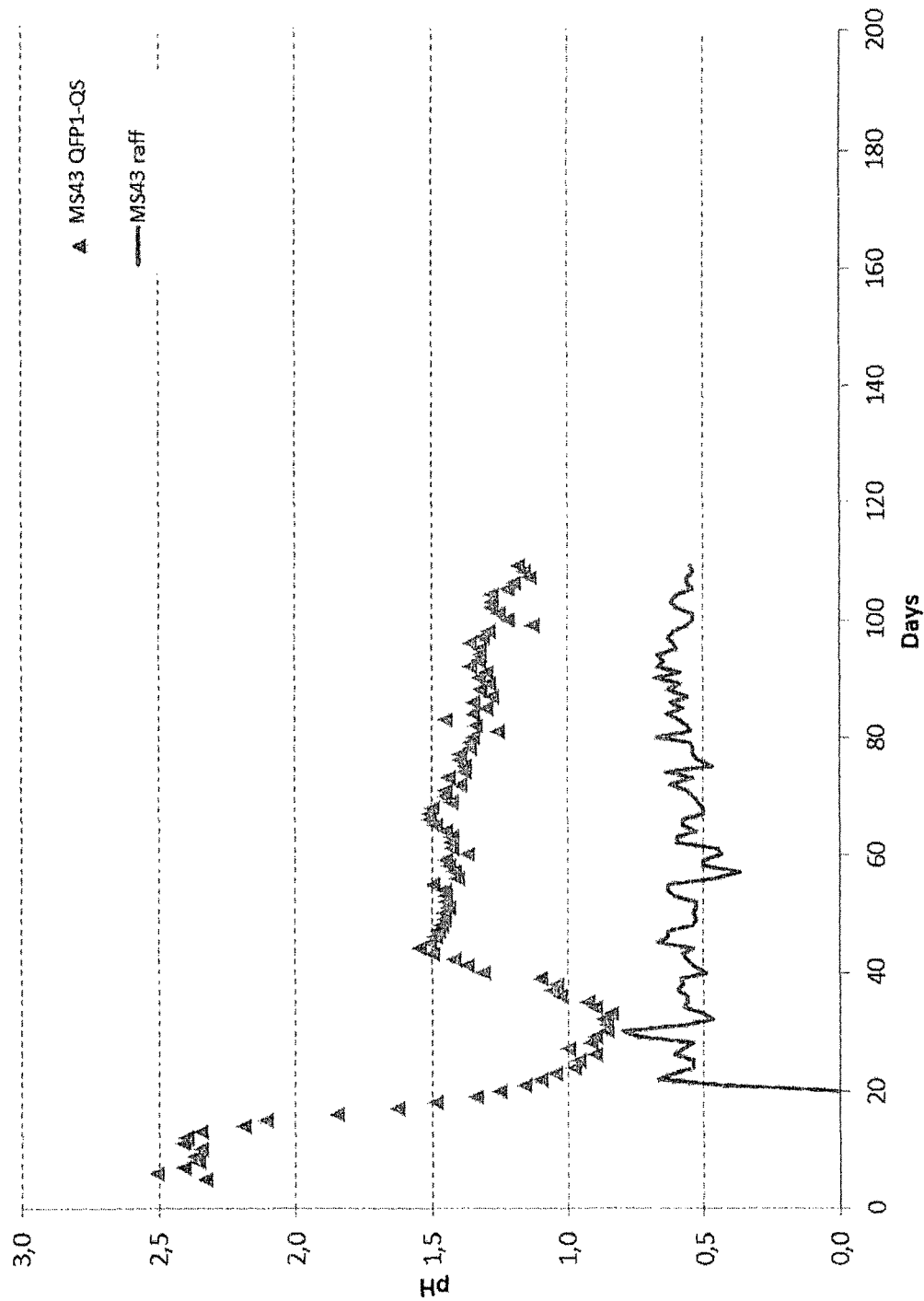
FIG. 31 shows the PLS and raffinate pH profiles.
Figure 32:
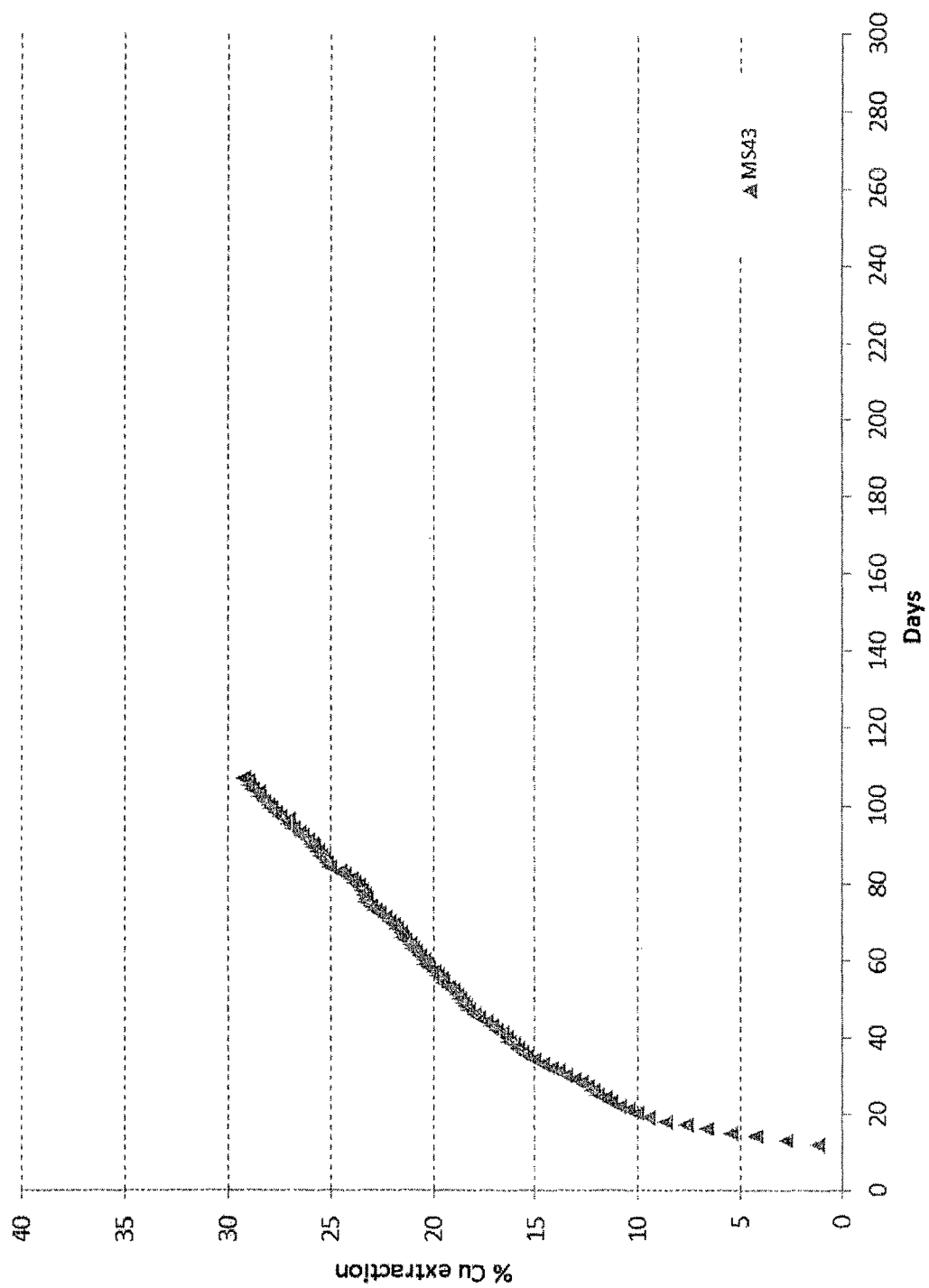
FIG. 32 shows the copper extraction achieved over time.

Acid consumption from gangue acid consuming minerals can be minimised by employing less acid in the raffinate used during the irrigation step/s. A six meter high column leach test was loaded with a crushed ore (80% passing ½") sample containing above 90% chalcopyrite and 0.37 wt. % total copper content. After agglomeration with 8 kg sulphuric acid per ton of ore and raffinate solution containing 150 g/L chloride ions, a 40 day resting step was employed. Subsequently, multiple irrigation steps (10 hours each) and alternating resting steps (14 hours each) were employed. Raffinate containing approximately 20 g/L acid and 150 g/L chloride ions was used during the irrigation steps for the first 20 days. A lower acid raffinate containing 5 g/L sulphuric acid and 150 g/L chloride ions was employed during the remainder of the irrigation steps (FIG. 29). The net acid consumption in kg per ton of ore, pH profiles and copper extractions are shown in FIGS. 30, 31 and 32 respectively.

Figure 33:
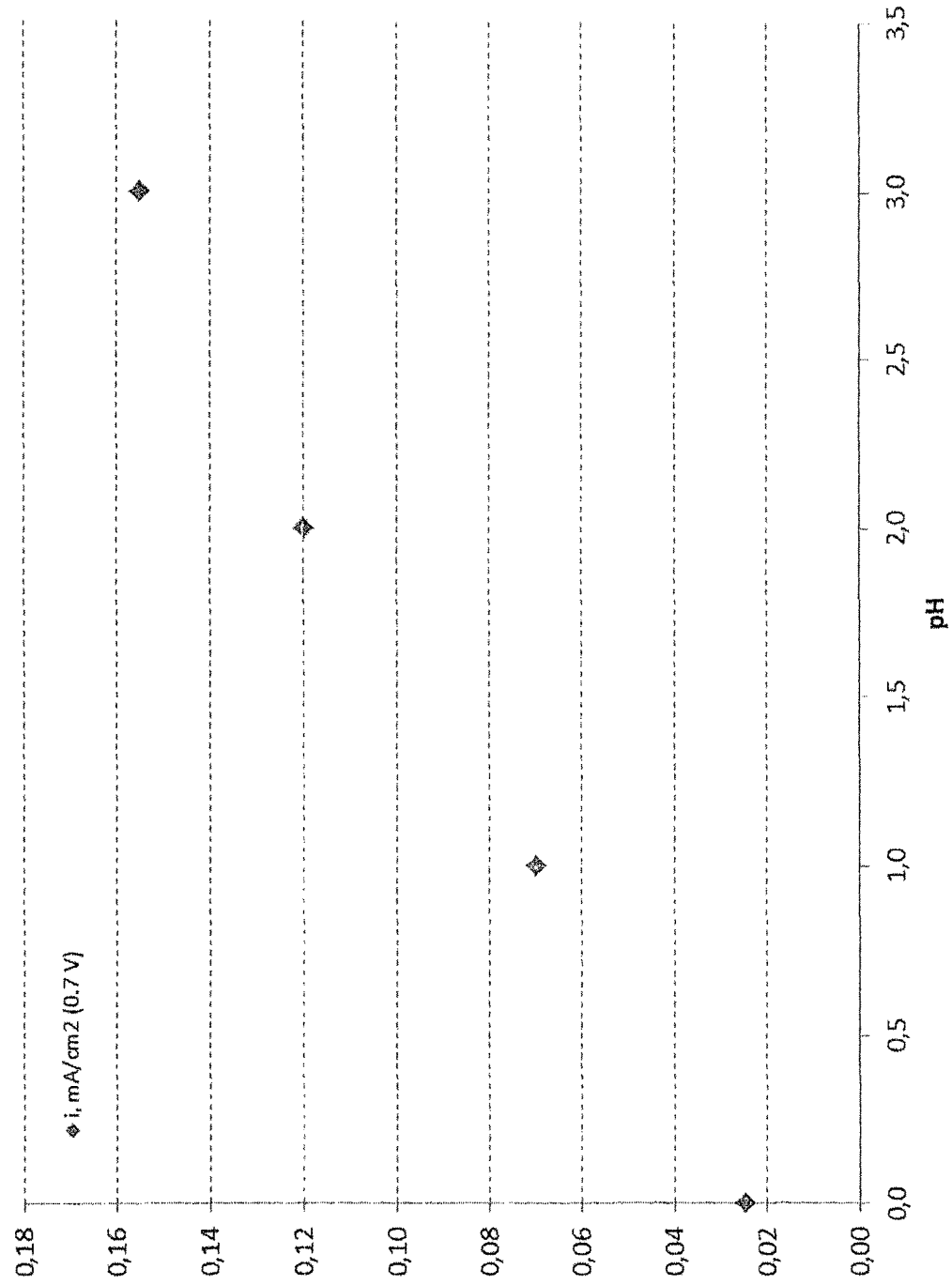
FIG. 33 approximate anodic current densities recorded at 0.7 volt for chalcopyrite electrode exposed to a different pH.

Chalcopyrite electrodes were exposed to de-aerated 5M NaCl solutions for 3 minutes at pH 0, 1, 2 and 3 (25° C.). After exposure, anodic sweep voltammograms were recorded between 0.4 and 1 volt at 1 mV/s. The approximate anodic current densities recorded at 0.7 volt for each electrode exposed to a different pH are presented in FIG. 33. It shows that anodic mineral reactivity increased in aforementioned conditions as a function of increasing pH, indicating increased rate of dissolution with increased solution pH.

Figure 34:
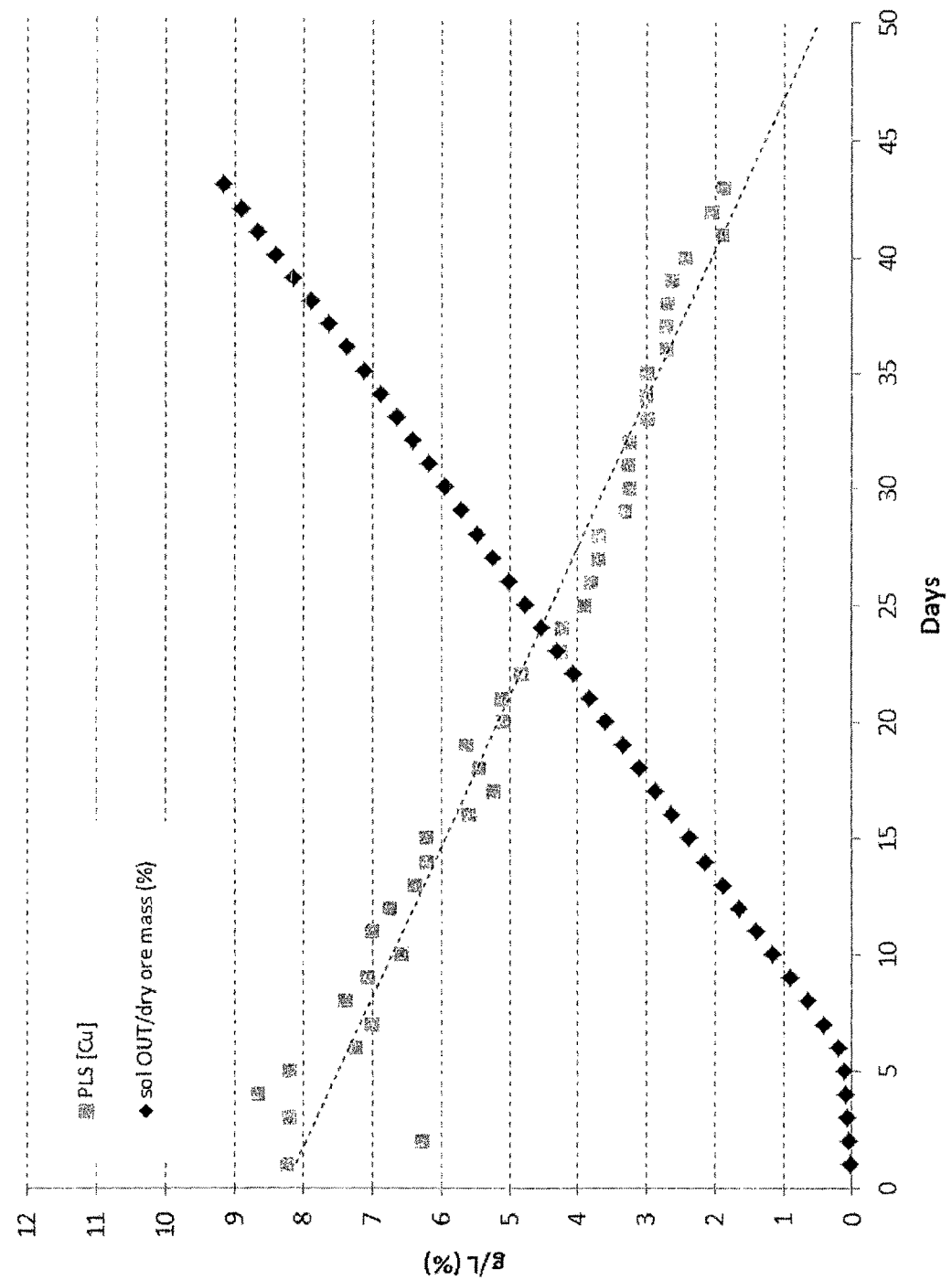
FIG. 34 shows PLS copper concentrations obtained during a rinse step. Solution weight % values collected are also shown.
Figure 35:
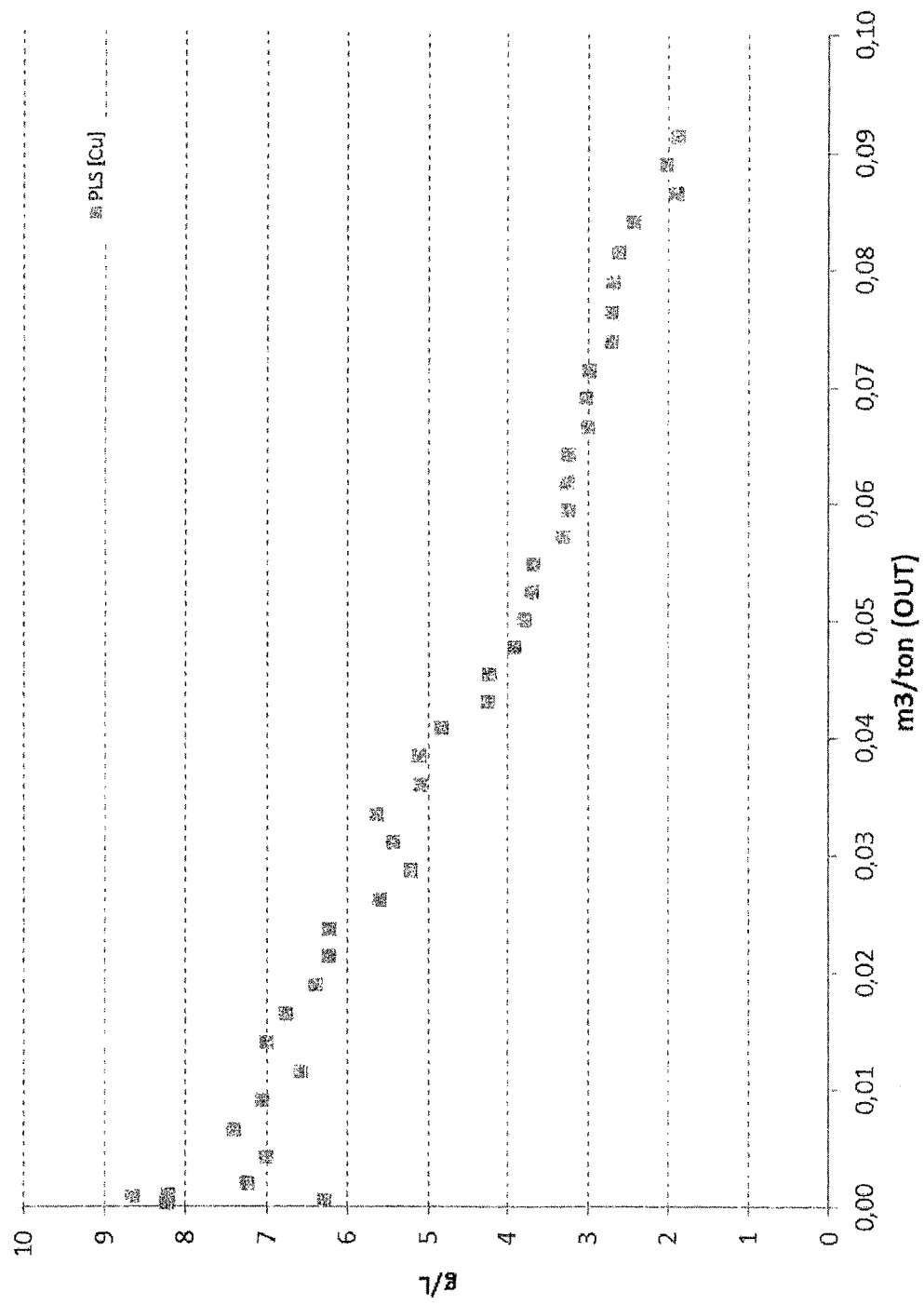
FIG. 35 shows PLS copper concentrations obtained during the rinse step as a function of the solution/ore ratio.

A ten meter high column leach test was performed on a crushed (80% passing ⅝") sample according to conditions described herein. Following the irrigation and resting steps, the system was allowed to drain excess solution for 15 days (no irrigation). After 15 days of drainage, a rinse step was performed to recover soluble copper remaining in the column. The rinse solution used was acidified water containing 20 g/L sulphuric acid. The system was irrigated at a solution application rate of 6 liters per hour per square meter for 5 hours daily. The system was rested for 19 hours daily. The copper concentrations over a 50 day period in the PLS (including copper from the rinse step) are presented in FIG. 34. The amount of accumulative PLS from the leach system is also presented in FIG. 34 as a % weight (calculated from solution density) against the weight of dry ore loaded in the leach column. The accumulative PLS volume per ton of ore loaded and copper concentrations are presented in FIG. 35.

Figure 36:
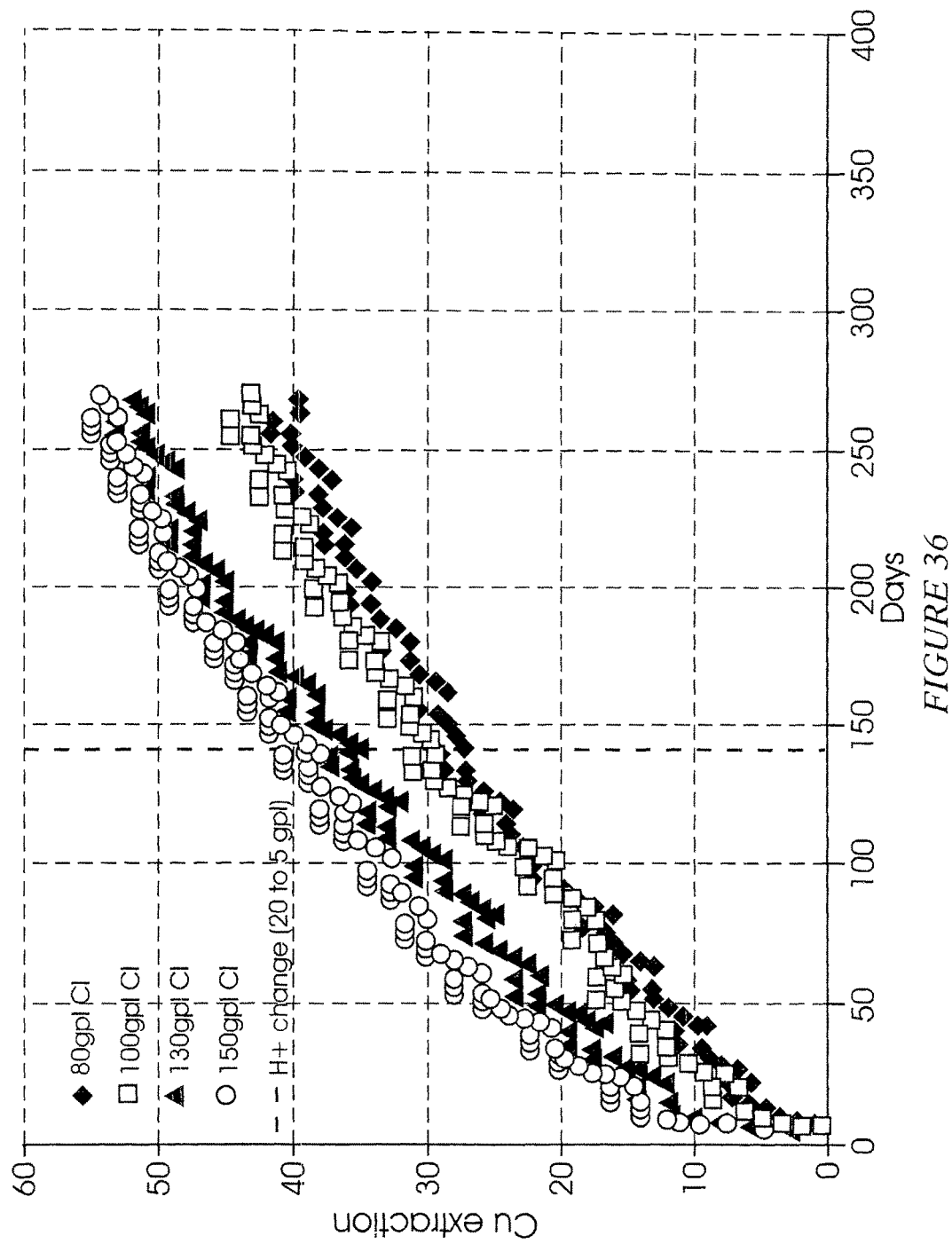
FIG. 36 shows copper extractions obtained as a function of increasing chloride ion concentrations employed in the raffinate during the irrigation steps.
Figure 37:
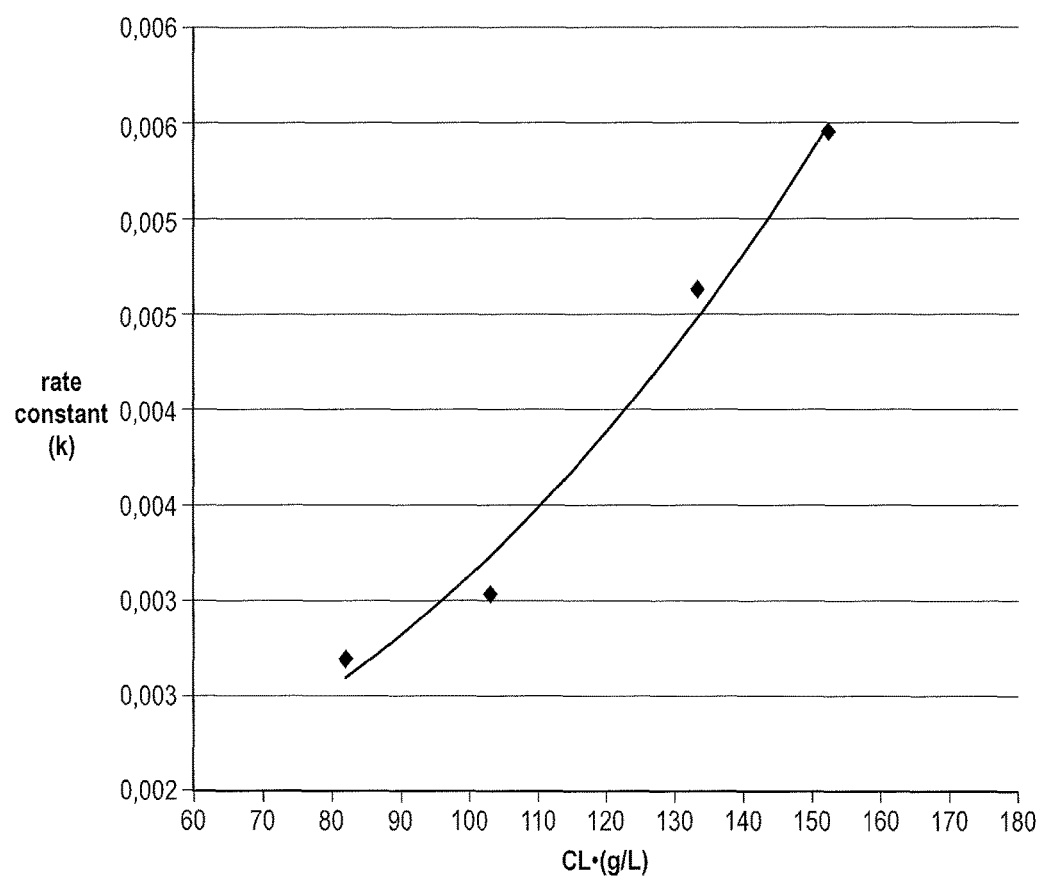
FIG. 37 captures the copper extraction rate constants calculated from data set presented in FIG. 36.

Four column leach tests were conducted on highly refractory 98% chalcopyrite (0.45 wt. % Cu) crushed (80% passing ½") ore samples. The samples were agglomerated with concentrated sulphuric acid and solutions containing 80, 100, 130 and 150 g/L chloride ions. A 45 day initial resting step was employed for all four leach tests followed by multiple irrigation steps (10 days) and alternating resting steps (10 days). During the irrigation steps, raffinate containing corresponding 80, 100, 130 and 150 g/L chloride ions were employed for solution application. The columns were aerated from after agglomeration. The copper extraction result obtained from each chloride concentration over time is presented in FIG. 36. Rate constants from common fit parameters were obtained for each chloride condition using a generic column leach rate expression (FIG. 37).

Figure 38:
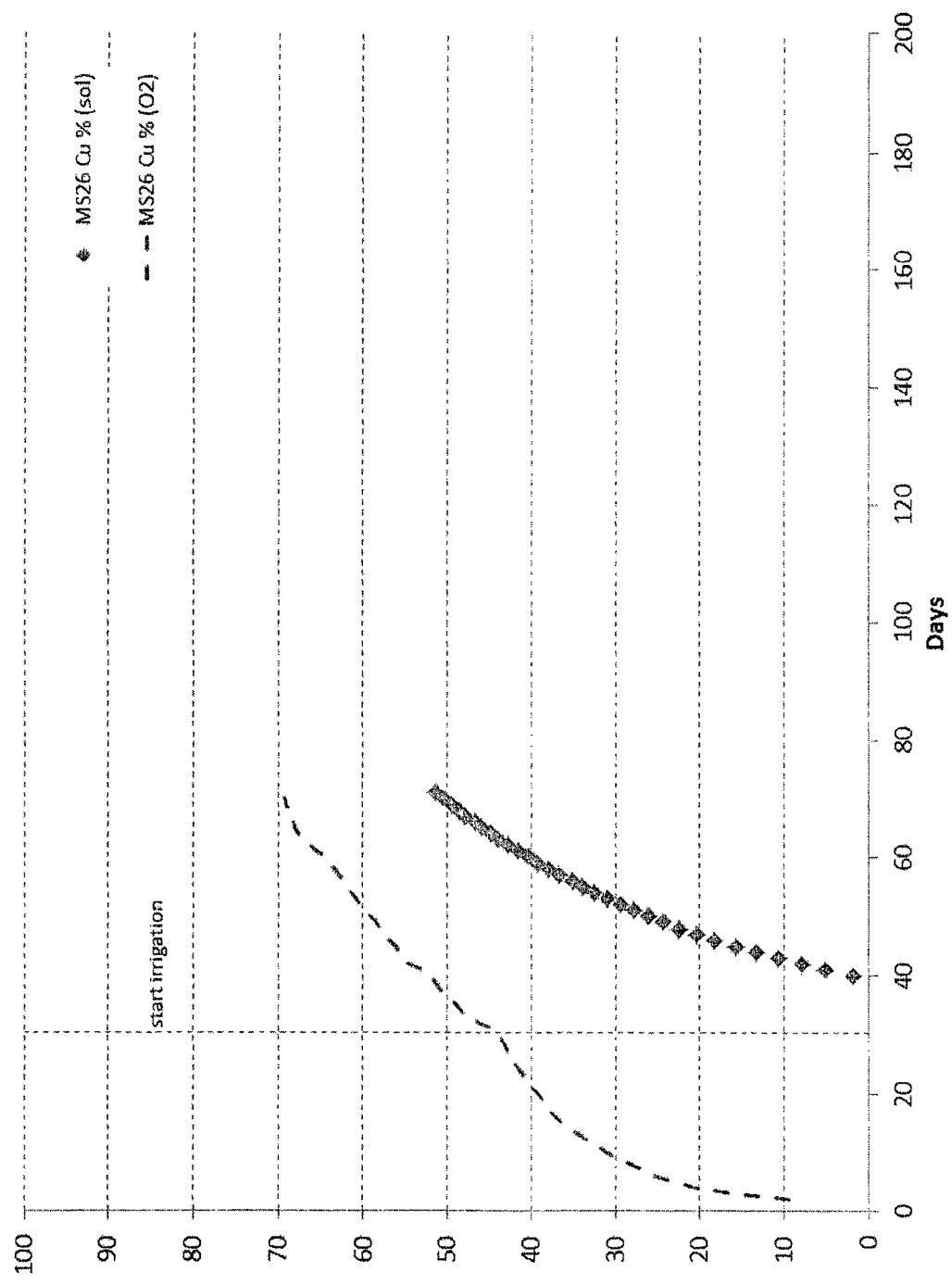
FIG. 38 depicts copper extraction values estimated from oxygen off-gas analyses and measured values from solution samples.

A copper sulphide ore (1 wt. %) was subjected to a six meter column leach test operated under conditions as described herein. Subsequent to agglomeration with concentrated sulphuric acid and 130 g/L chloride ion containing raffinate, a 30 day initial resting step was employed and the system aerated. During this initial resting step, oxygen concentration measurements were performed on the inlet air (bottom of column) and outlet air (top). The copper extraction during this initial resting step was estimated (FIG. 38) using the oxygen data; approximately 45% after 30 days. In cases such as presented in FIG. 38, where reasonable amounts of copper was leached during the initial resting period, continuous irrigation (no further resting) can be employed to recover the copper under a shorter solution retention time. This method may decrease the leach cycle time. Copper extraction (sulphide oxidation) may continue during this single irrigation step as presented in FIG. 38. The solution/ore ratio may remain less than 3 $m^3$ per ton of ore over a complete leach cycle.

Figure 39:
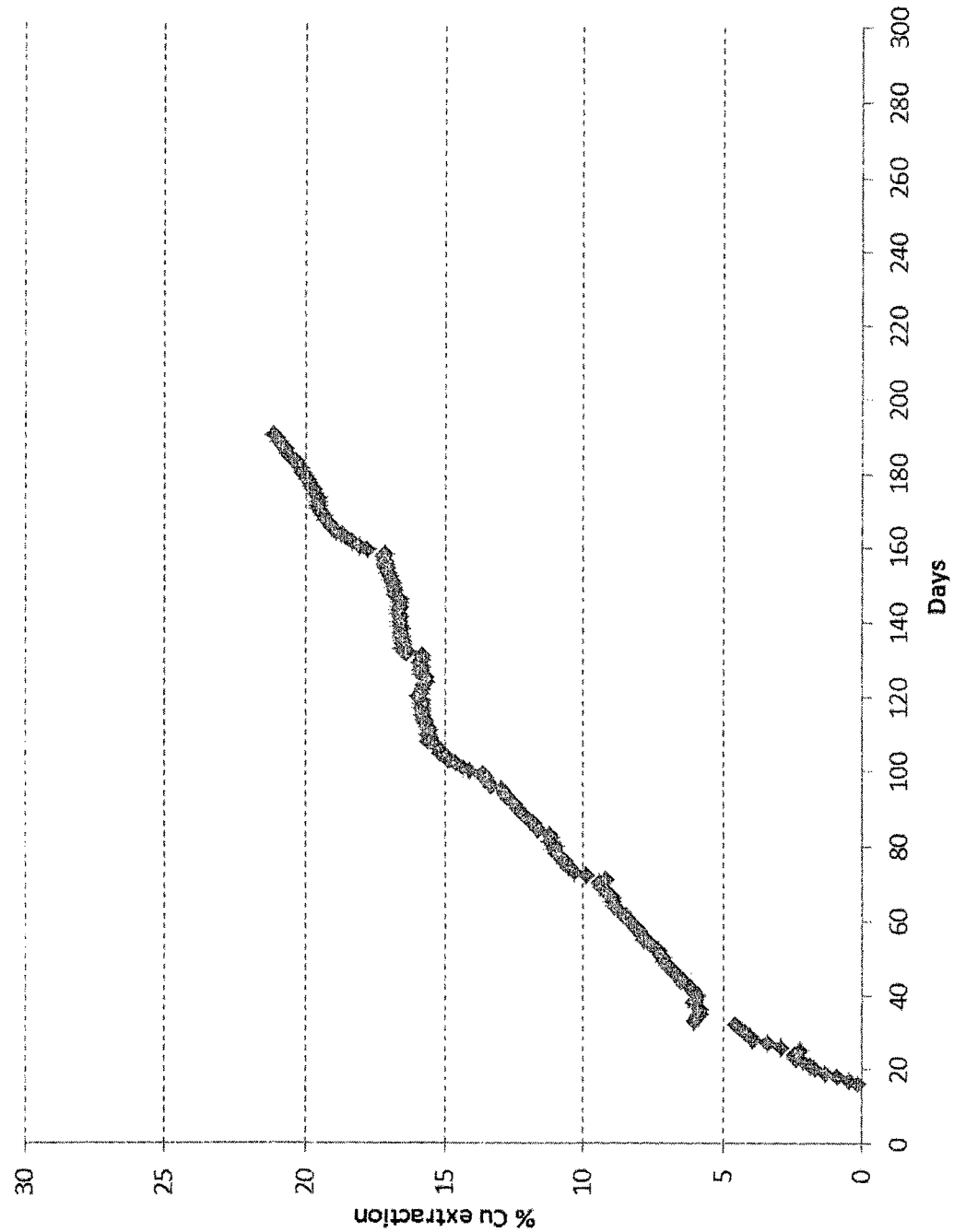
FIG. 39 depicts copper extraction versus leach period for a 6 m column test employing a combination of resting steps and irrigation steps and continuous irrigation.

A crushed (80% passing ½") chalcopyrite (95%, 0.36 wt. % Cu) ore was subjected to a six meter column leach test operated under conditions as described herein. Subsequent to agglomeration with concentrated sulphuric acid and 150 g/L chloride ion containing raffinate, a 47 day initial resting step was employed. The system was aerated throughout the column operation. Subsequent to the initial resting period, multiple irrigation steps (10 hours ON at 6 L/h·$m^2$) and multiple alternating resting steps (14 hours each) were employed for 100 days. After the 100 days, the irrigation and resting steps methodology was replaced by continuous (24 hours ON) irrigation at 6 L/h·$m^2$ for 30 days. The impact of this change in methodology is presented in the copper extraction curve shown in FIG. 39. During the following 20 days the same aforementioned resting/irrigation steps methodology was restored and the impact on the copper extraction noted (FIG. 39). Day 158; the column started a drainage procedure for 15 days (no solution application). After the 15 days of draining, the aforementioned resting/irrigation steps methodology was again implemented and the impact on the copper extraction noted. It is important to note that throughout the changes in operating methodology, the acidity was maintained such that the PLS pH varied only slightly between approximately pH1.5 and 1.7.

The invention claimed is:

1. A method of leaching copper from a heap of crushed ore comprising at least one resting step followed by an irrigation step, wherein during the irrigation step a leach solution that contains chloride ions is applied to the ore at a higher rate than during the resting step and during the irrigation step a chloride ion concentration of the leach solution is between 100 g/l and 190 g/l, wherein the resting step has a duration of at least 20 hours and in the resting step the leach solution contacting the ore contains at least 0.5 g/L of soluble copper, wherein the chloride ions are introduced by the addition of compounds selected from the group consisting of NaCl, $MgCl_2$, KCl, $AlCl_3$ and mixtures thereof.

2. The method according to claim 1 wherein, during the resting step, no leach solution is applied to the ore.

3. The method according to claim 1 wherein, during the irrigation step, the leach solution has a sulphuric acid concentration of between 4 g/l and 100 g/l.

4. The method according to claim 1 wherein, during or after the irrigation step, copper is recovered from a solution drained from the heap by a solvent extraction step with at least one copper-loaded organic washing stage to promote an electrolyte chloride ion concentration below 50 ppm.

5. The method according to claim 1 wherein a first resting step occurs after construction of the heap from agglomerated ore.

6. The method according to claim 1 wherein the leach solution is continuously supplied during the irrigation step.

7. The method according to claim 1 wherein the resting step has a duration of up to 50 days to enhance dissolution of the ore.

8. The method according to claim 1 wherein, during the resting step, the leach solution has a pH less than about 3.5 to enhance dissolution of the ore.

9. The method according to claim 1 wherein the heap is aerated during the resting step to enhance dissolution of the ore.

10. The method according to claim 1 wherein, during the irrigation step, the heap is irrigated using a grid on a surface of the heap or within the heap.

11. The method according to claim 10 wherein the grid is constructed or operated so the leach solution is applied only to a selected portion of the heap.

12. The method according to claim 1 wherein, during the irrigation step, the leach solution is applied to the heap at a rate which is less than about 3 m$^3$/ton of ore to enhance dissolution of the ore.

13. The method according to claim 12 wherein the heap is aerated during the irrigation step to enhance dissolution of the ore.

14. The method according to claim 1 which includes a plurality of resting steps and a plurality of irrigation steps and each resting step is followed by a respective irrigation step.

15. The method according to claim 1 wherein the ore includes at least one of the following: chalcopyrite; refractory copper oxide minerals; chalcocite; bornite; enargite; covellite; and copper-containing clay minerals.

16. The method according to claim 1 followed by a rinse step to recover soluble copper and chloride from the heap.

17. The method according to claim 16 wherein the rinse step continues for a period of less than 50 days.

18. The method according to claim 1 wherein the ore is chalcopyrite.

19. The method according to claim 1 wherein the crushed ore has a size wherein about 80% passes about 0.5 inch.

20. The method according to claim 1 wherein the heap is formed entirely of crushed ore.

21. A method of leaching copper from a heap of agglomerated ore comprising at least one resting step occurring after construction of the heap followed by an irrigation step, wherein during the irrigation step a leach solution that contains chloride ions is applied to the ore at a higher rate than during the resting step and during the irrigation step a chloride ion concentration of the leach solution is between 100 g/l and 190 g/l, wherein the resting step has a duration of at least 20 hours and in the resting step the leach solution contacting the ore contains at least 0.5 g/L of soluble copper, wherein the chloride ions are introduced by the addition of compounds selected from the group consisting of NaCl, MgCl$_2$, KCl, AlCl$_3$ and mixtures thereof.

* * * * *